US007168905B1

(12) United States Patent
Solomon et al.

(10) Patent No.: US 7,168,905 B1
(45) Date of Patent: Jan. 30, 2007

(54) STORAGE AND RETRIEVAL SYSTEM

(75) Inventors: Stanley B. Solomon, Rolling Hills Estates, CA (US); Tsuneo Shishido, Rancho Palos Verdes, CA (US); Burton Barnett, Rossmoor, CA (US)

(73) Assignee: Worthwhile products, Rolling Hills Estates, CA (US)

( * ) Notice: Subject to any disclaimer, the term of this patent is extended or adjusted under 35 U.S.C. 154(b) by 0 days.

(21) Appl. No.: 11/195,248

(22) Filed: Aug. 1, 2005

(51) Int. Cl.
*E04H 6/00* (2006.01)
(52) U.S. Cl. ............... 414/237; 414/234; 414/277; 312/266; 312/267; 312/268; 198/347.1; 198/580
(58) Field of Classification Search ............... 414/234, 414/237, 277; 312/266, 267, 268, 131, 132, 312/139.1, 139.2; 198/347.1, 347.2, 580; 104/27, 28, 29
See application file for complete search history.

(56) References Cited

U.S. PATENT DOCUMENTS

| 2,089,341 | A | | 8/1937 | Cocks |
| 2,451,120 | A | | 10/1948 | Rossetter |
| 2,617,700 | A | | 11/1952 | Christie et al. |
| 3,763,991 | A | * | 10/1973 | Batik ................. 198/465.3 |
| 3,860,130 | A | | 1/1975 | Frangos |
| 4,191,435 | A | | 3/1980 | Lehman |
| 4,422,554 | A | | 12/1983 | Lichti |
| 6,792,935 | B2 | * | 9/2004 | Williams et al. ......... 126/41 R |
| 6,923,612 | B2 | * | 8/2005 | Hansl ..................... 414/277 |

* cited by examiner

Primary Examiner—Eileen D. Lillis
Assistant Examiner—Michael Lowe
(74) Attorney, Agent, or Firm—Kelly Lowry & Kelley, LLP

(57) ABSTRACT

A storage and retrieval system includes a plurality of individual storage units stacked in multiple columns. Each storage unit includes wheels which engage a track for selective movement along the track. Vertical and horizontal actuators are used to move the storage units in sequence. Preferably, the actuators are power-driven, and control circuitry is used to coordinate the movement of the actuators.

18 Claims, 29 Drawing Sheets

STORAGE AND RETRIEVAL SYSTEM

BACKGROUND OF THE INVENTION

The present invention generally relates to storage and retrieval systems. More particularly, the present invention is directed towards an improved low cost, high density modular storage and retrieval system employing a plurality of movable storage units.

In the kitchen, pots, pans, flour, condiments, boxes and cans of food, mixers and other paraphernalia are usually stored in drawers and cupboards which are scattered throughout the kitchen. Pots and pans are ordinarily kept in cupboards which are dark, difficult to access and maintain. The average housewife is subjected to considerable exercise and rummaging through cupboards in an attempt to locate a pot or pan of the desired shape and size. Many cupboards are either below sinks or stoves, or elevated. This requires the housewife to bend down to find the desired container, pot or food article, or sometimes stand on a chair to retrieve these items. The storage of such kitchen equipment and food takes up a large number of cubic feet of space, some of which is wasted as the items are not readily retrievable in corners and the like.

A similar problem is encountered with closets, which are used to store shoes, pants, blouses, dresses, socks and other non-clothing items. Oftentimes, shoes are stored on the floor, clothes are hung on elongated rods in the closet (which often do not provide sufficient storage space) and other items are stacked on shelves—often at a considerable height. Such an arrangement presents many of the same disadvantages of kitchen storage.

Retrieving items in such settings is particularly difficult for those individuals who are taller than usual, shorter than usual, elderly or handicapped. Much of the space in corners and near ceilings are wasted space in a household.

The present invention seeks to provide a simplified, efficient and comparatively inexpensive storage conveyor apparatus for easy installation in a kitchen, closet, or the like. The invention can utilize adjacent wasted spaces above stairways, beneath floors, above ceilings, in corners, etc.

Various conveyor systems for a wide variety of goods, including elevating conveyors, horizontal conveyors, and combination types, are known in the prior art. This so-called "dumb-waiter" for elevating various articles in homes, restaurants and the like between different floor levels has long been known. The art relating to storage and display cases provides a number of devices in which two adjacent columns of containers are disposed one behind the other with the upward movement of one column and a downward movement of the adjacent one being obtained by associating the various containers with chains or cables passing over suitable wheels or sprockets. However, such devices present various drawbacks. For example, the type of movement from one column to another characteristic of the chain or cable type mechanism is such that a considerable amount of clearance is required for the containers. Moreover, the sprockets and cables operate under considerable loads and the bearings necessary to support these loads must be mounted upon sufficient structures to adequately carry the stresses to the floor. An elaborate shifting sequence must take place as the tension members pass over the pulleys in order to avoid inverting the containers during the process.

One of the main drawbacks encountered in automatic and semi-automatic storage systems relates to the complexity of the mechanisms used. Such complexity adds to the cost of installing the system, and adversely affects the reliability of such systems. Incorporating chain and pulley systems, unique lifting mechanisms, etc., renders the systems complicated and expensive to build, prone to breakage, and increases maintenance time and costs.

Accordingly, there is a continuing need for an automated storage and retrieval system which is simplified, efficient and comparatively inexpensive. The present invention fulfills these needs and provides other related advantages.

SUMMARY OF THE INVENTION

The present invention resides in a storage and retrieval system. The system generally comprises a plurality of individual storage units in stacked relation in multiple columns. Each storage unit includes wheels which are engaged with an endless track for selective movement along the track. An endless track, as used herein, is intended to mean a track which enables the continuous movement of the storage units. Typically, the movement of the storage units is on a continuous circuit or circular in nature. In one embodiment, the storage units are stacked into first and second end columns which are adjacent to each other. In other embodiments, the first and second end columns are separated by at least one column of storage units therebetween.

The endless track may comprise a track comprising a pair of parallel single tracks. Each track has an outer rail of a generally rectangular configuration. A pair of inner-rails are spaced from one another and extend from a top to a bottom of each outer rail.

In a preferred embodiment, a stop is disposed on the top of the outer rail, and adapted to permit one-way travel of a storage unit. The stop typically comprises a spring for biasing the stop away from the rail, such that once the storage unit has passed the stop it cannot reverse its travel. The wheels of each storage unit typically extend from a top portion thereof so as to suspend the storage unit from the track.

In another embodiment, the track comprises a dual track, including a first set of tracks and second set of tracks positioned generally parallel to one another. The first and second sets of tracks each comprise a first rail in a first plane, and a second rail in a second plane and in overlapping arrangement with the first rail.

In this embodiment, each storage unit includes a first set of wheels extending therefrom a first distance for engagement with the first rail. A second set of wheels extend from the storage unit a second distance and engage the second rail. Preferably, the first and second sets of wheels extend from a top portion of the storage unit, such that the storage unit is suspended by the rails.

Preferably, the system includes means for determining balance of the storage units.

A first vertical actuator is adapted to lift a first end column of storage units. Typically, the vertical actuator has an arm which is selectively movable under a bottom storage unit of the first end column.

A first horizontal actuator is used to move a storage unit from a top position in the first end column to a top position in an adjacent column.

A second vertical actuator is adapted to support all but a bottom storage unit of a second end column of storage units. Typically, the second vertical actuator also has an arm selectively movable under a storage unit. In the operation of the invention, the arm extends under all but a bottom storage unit of the second end column so as to support or lower all but the bottom storage unit.

A second horizontal actuator is used to move the bottom storage unit from a bottom position in the second end column to a bottom position of an adjacent column.

Typically, the first and second horizontal actuators and the first and second vertical actuators are power-driven. The first and second horizontal actuators include a ram adapted to extend from and contact the sidewall of a storage unit and push the storage unit to an adjacent column. Control circuitry is used to coordinate the movement of the actuators, such that the storage units are moved in sequence.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention is directed to a storage and retrieval system. This system is intended to maximize the storage capacity anywhere in a home or business, and allow for easy access and retrievability for anyone whether he or she be tall, short or handicapped, such as in a wheelchair. As will be more fully discussed herein, the design and configuration of the system is not complex so as not to be overly expensive or prone to breakage and maintenance.

Figure 1:
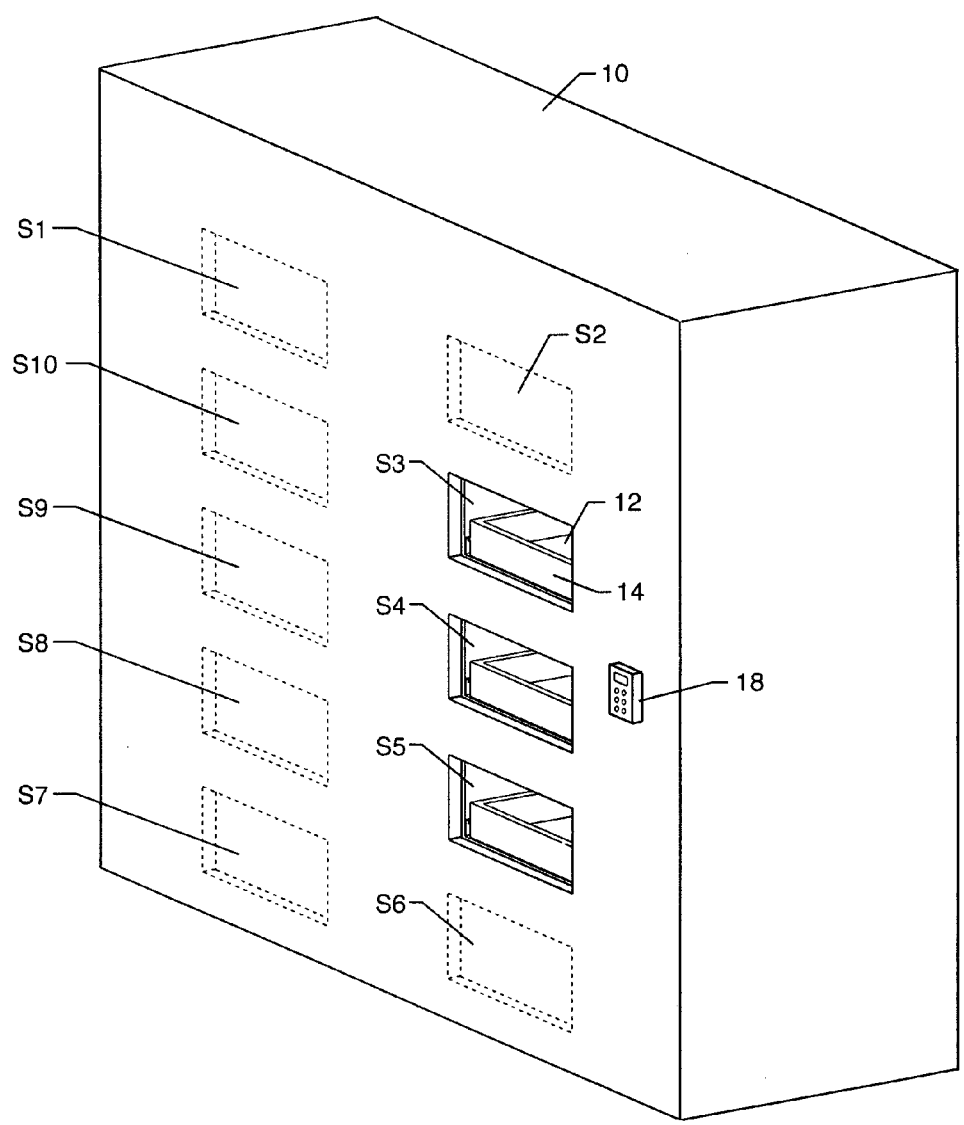
FIG. 1 is a front perspective view of a storage system embodying the present invention.

With reference now to FIG. 1, the storage system of the present invention is illustrated in an upright box structure 10 defining a housing or the like. It will be understood by those skilled in the art that the system of the present invention need not necessarily be housed in such a structure 10, but instead can be built into cabinetry, walls of a home or business, etc.

One or more apertures 12 are formed in the structure 10 for access to drawers 14 which are preferably slidably mounted within a storage unit 16. As will be more fully explained herein, the storage units 16 are stacked upon one another or in aligned or stacked relation so as to form a plurality of columns. In this description, two end columns occupying a total of ten spaces S1–S10, and having a total of nine storage units 16, so as always to present a vacant space (typically in one of the corners of the columns) is used for purposes of illustration. However, it will be readily understood by those skilled in the art that the number of columns and the number of stacked storage units 16 can be varied. For example, there can be as few as two columns having the total of only four spaces, with three storage units 16. Alternatively, there can be a plurality of columns each with two or more storage units 16 stacked upon one another to form the columns. The fewer the columns and larger number of storage units 16, the more vertical in operation is the system. Conversely, the more columns and the fewer number of storage units 16, present a more horizontally operated system. Thus, although two adjacent end columns with a total of nine storage units are used for purpose of illustration and example, the invention is not intended to be limited to such.

In a particularly preferred embodiment, the system of the present invention presents multiple apertures 12, such that multiple drawers 14 or storage units 16 can be accessible at any given time. The apertures or openings 12 are preferably arranged such that a relatively tall person can access the upper most position, and shorter individuals, such as children, or even those in wheelchairs or the like can access a lowermost opening to a storage unit 16.

In a preferred embodiment of the system, a controller 18 is mounted to the structure 10 or wall, or may be in the form of a wireless controller or even a controller wired to the system but placed in another room or the like. The controller 18 is used by the end user to select which storage unit 16 to be present in one of the openings 12 so as to be accessed. The controller 18 includes or communicates with electronic control circuitry for controlling the movement of the storage units 16, as will be more fully described herein. In this manner, the end user can select which storage unit 16 is to be moved into which desired opening 12 by simply entering the commands into the controller 18, such as by using a keypad or the like. Use of a wireless controller would allow one in the kitchen to point the controller 18 to the system and select a given storage unit 16 which might contain a given pot, ingredient, can of food, etc. Similarly, a controller 18 can be placed in another room, such as in a bedroom, so that an individual can select a given storage unit 16 which may contain cold cereal or other breakfast item to be moved into a given opening 12 while the individual showers or traverses the distance between the bedroom and the kitchen. Preferably, the system rotates the storage unit 16 in a relatively rapid manner so that a long wait is not necessary, even if the command is given at the structure 10 itself.

Figure 2:
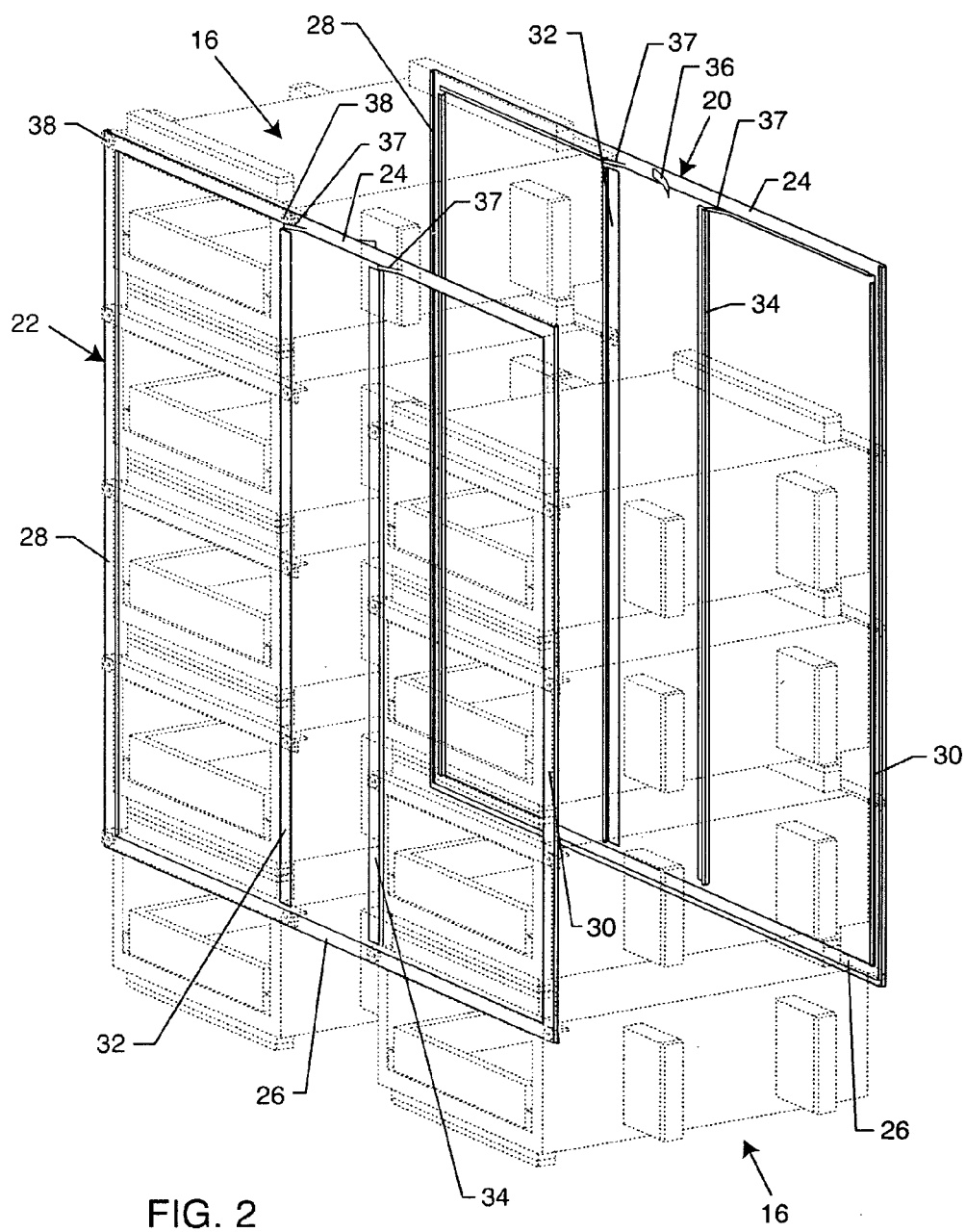
FIG. 2 is a perspective view of a single track system used in accordance with the present invention and showing a plurality of stacked storage units operably connected thereto, in phantom.
Figure 3:
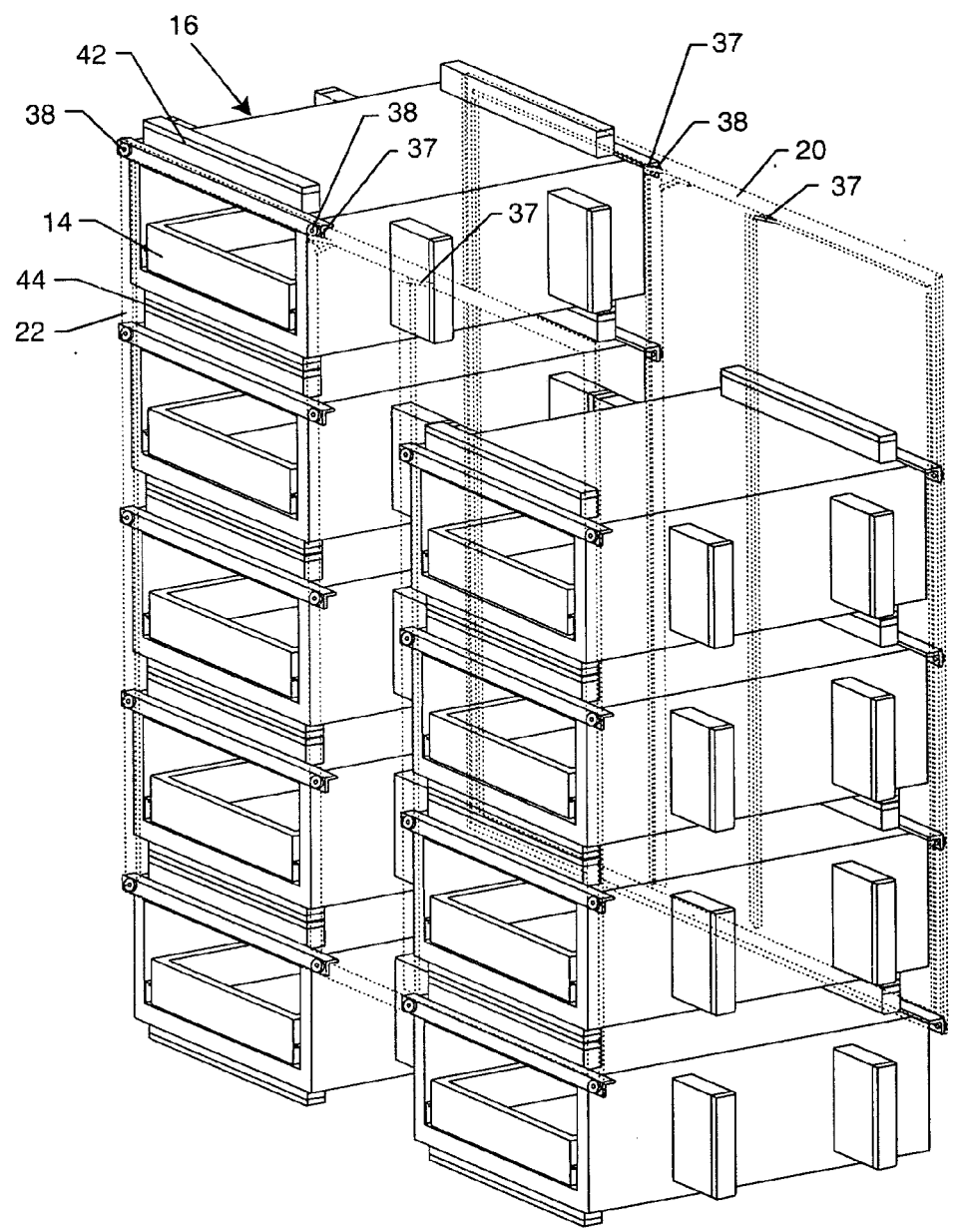
FIG. 3 is a perspective view of the stacked storage units, with the single track illustrated in phantom.
Figure 4:
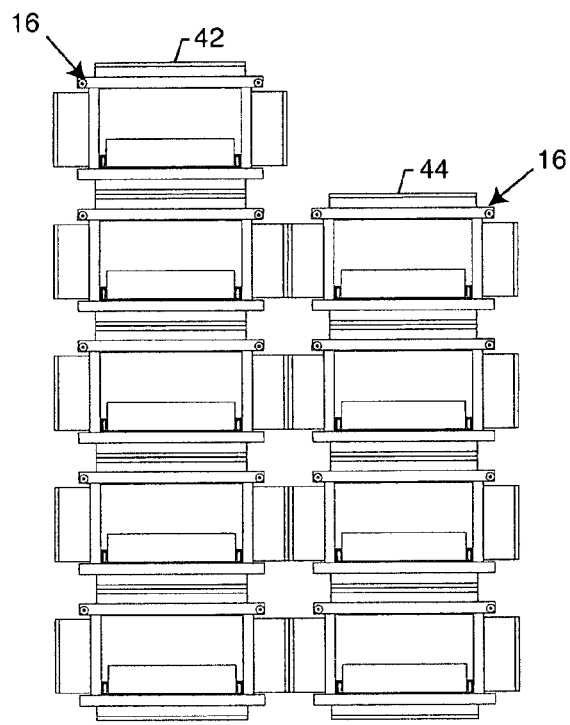
FIG. 4 is a front elevational view of the stacked storage units in accordance with the present invention.
Figure 5:
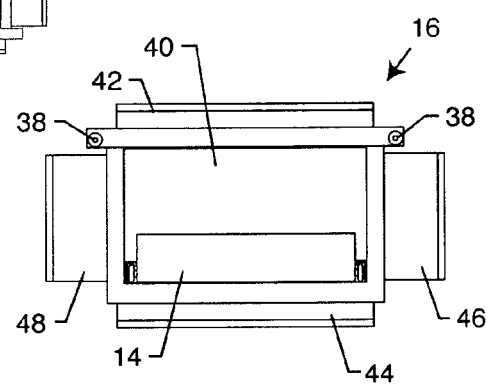
FIG. 5 is a front elevational view of a single storage unit embodying the present invention.
Figure 6:
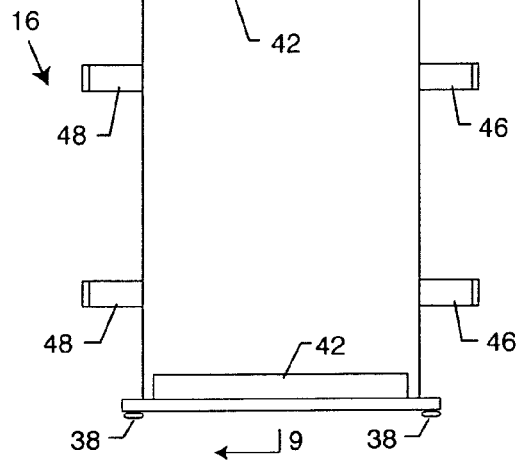
FIG. 6 is a top plan view of the storage unit of FIG. 5.
Figure 7:
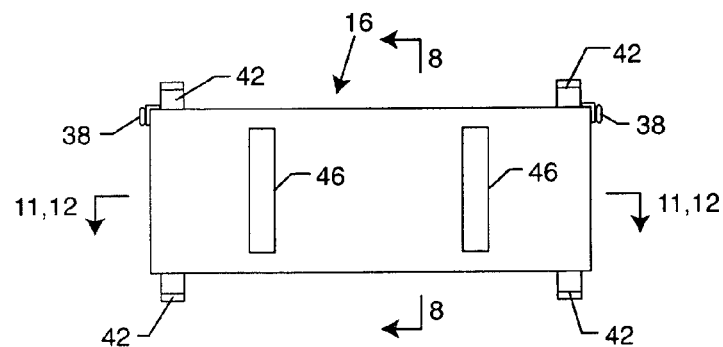
FIG. 7 is a side elevational view of the storage unit of FIG. 5.
Figure 8:
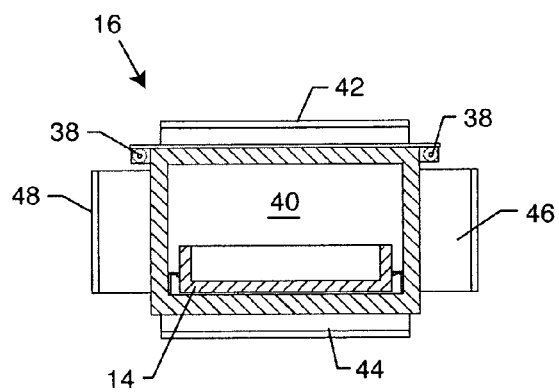
FIG. 8 is a cross-sectional view taken generally along line 8—8 of FIG. 7.
Figure 9:
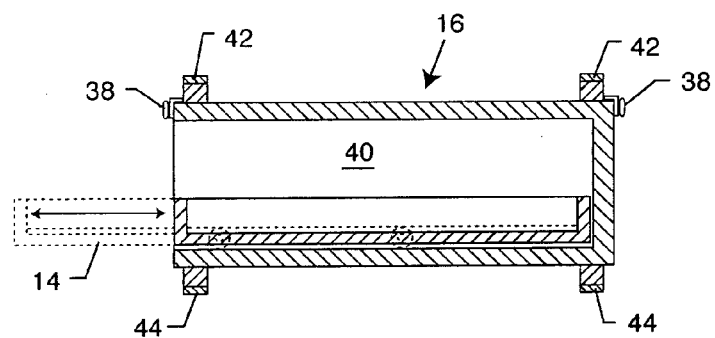
FIG. 9 is a cross-sectional view taken generally along line 9—9 of FIG. 6, illustrating a slidable drawer thereof.

With reference now to FIGS. 2–4, an endless track is shown in FIG. 2 comprising tracks 20 and 22 which are positioned generally parallel to one another and spaced apart a distance substantially equal to the length of a storage unit 16, as illustrated. By "endless" herein, it is intended to convey the meaning that the storage unit 16 can travel in the pre-defined path, typically a circular path, continuously without end. The track system 20 and 22 illustrated in FIG. 2 comprises what is referred to herein as a single track system. That is, each track 20 and 22 includes upper and lower rails 24 and 26 spaced from one another vertically and positioned along the same plane. Ends of the rails 24 and 26 are interconnected with end vertical rails 28 and 30. A pair of inner-rails 32 and 34 are spaced apart from one another and extend substantially from the upper rail 24 to the lower rail 26. As will be more fully discussed herein, each track 20 and 22 includes a flexible stop 36, typically along the uppermost rail 24, and possibly on the lower rail 26. The stop 36 is biased outwardly such that a storage unit 16 can pass thereby, but the stop 36 springs back to prevent the storage unit 16 from reversing travel. Although the tracks 20 and 22 are generally square or rectangular, it will be appreciated by those skilled in the art that the movement of the storage unit 16 thereon is generally circular and continuous. The upper rails 24 may include ramps 37 to facilitate smooth transition of storage unit 16 from one column to the next.

As can be seen in FIGS. 2 and 3, each storage unit 16 includes wheels 38 which engage the track 20 and 22 so that the storage unit 16 is slidably movable along the pair of tracks 20 and 22.

As can be seen from FIG. 2, the wheels 38 of a given storage unit 16 engage corresponding rails 28 and 32 or 30 and 34 when in a vertical motion, and upper rail 24 when positioned at an upmost position, or bottom rail 26 when in a lower position.

Throughout the description hereof, similar functional structure or components in different embodiments may be labeled with the same reference number. Thus, as can be seen from the description above, the tracks 20 and 22 are substantially identical and mirror-imaged structures.

Of particular reference now to FIGS. 3 and 4, two columns of storage units 16 are illustrated. As discussed above, in the illustrated exemplary embodiment, a total of ten spaces or cavities are available within the structure 10. However, to provide movement of the storage unit 16 in sequential fashion, an empty space is provided, as illustrated in FIGS. 3 and 4. As will be seen herein, this empty space is typically in one of the four corners, or in the upper most and lower most spaces of the end columns. As will be more fully discussed herein, each storage unit 16 travels in a sequential, or generally circular, path during the course of operation of the system.

With reference now to FIGS. 3–9, each storage unit 16 defines an inner cavity 40 for the storage of items therein. In a particularly preferred embodiment, a drawer 14 is disposed within the cavity 40, and is slidably extended and retracted out of and into the cavity 40, such as by rollers, cabinet sliders, tongue and groove inner-connection, etc. Such would enable the end user to pull out the drawer 14 and retrieve selected items therefrom during operation of the system. Although the storage unit 16 of a given system are typically relatively the same size, there may be as few as a single drawer 14 within the inner compartment 40, or a plurality of drawers 14 within the inner compartment 40. Thus, for example, a storage unit 16 with a single drawer 14 could accommodate larger or taller items, such as a two liter bottle of soda. However, placing two or three drawers 14 within the same inner space 40 would enable the storage of smaller cans or other smaller items in each drawer 14. Of course, it will be appreciated that the drawer 14 is not necessary, but rather the items can be stored directly within the inner storage cavity 40.

In a particularly preferred embodiment, spacers 42 and 44 extend from the top and bottom of each storage unit 16. As illustrated in FIGS. 3 and 4, the lower spacers 44 of one storage unit 16 will contact and rest or slide upon the upper spacers 42 of a storage unit 16 immediately below it. Preferably, spacers 46 and 48 extend from the sides of each storage unit 16 as well, such that the storage units are in fixed spacial relationship with one another. In a particularly preferred embodiment, the spacers 42–48 are comprised of or include an outermost layer of relatively friction free material, such as Teflon, plastic, smooth metal, etc. which enable the storage unit 16 to slide past one another relatively easy even if the spacers 42–48 come into contact with one another during the movement of the storage unit 16.

Preferably, the wheels 38 extend from an upper portion of the storage unit 16, such that the storage unit 16 is essentially suspended from the upper or lower rails 24, 26. Suspension renders it relatively easy for the storage unit 16 to be horizontally moved across the upper or lower rails 24 or 26.

With reference to FIGS. 10–13, the storage units 16 are preferably loaded with items such that they are substantially balanced or such that the weight of the items placed therein are centered or substantially spread across the inner cavity 40 or drawer 14 of the storage unit 16. Extreme unbalancing may potentially cause the storage unit's wheels 38 to bind. Accordingly, means are contemplated for indicating balance of the storage unit 16.

Such means can be in the form of visual aids for the end user. For example, a bubble level device 50 can be placed on the storage unit, such as the front panel of the drawer 14, so that the individual call determine that the bubble is within a safe range and the storage unit 16 substantially balanced.

Figure 11:
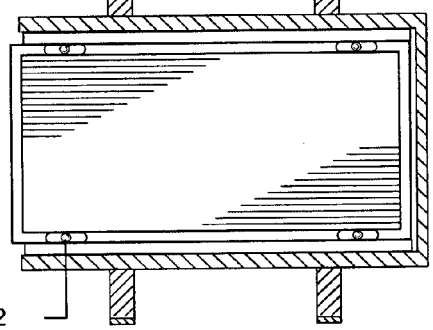
FIG. 11 is a cross-sectional view taken generally along line 11—11 of FIG. 7.

Alternatively, as illustrated in FIG. 11, the storage unit 16 may include electronic sensors 52 which would detect when the storage unit 16 becomes unbalanced. In such case, an alarm, such as a visual or audible alarm, could be activated to alert the end user of the unbalanced situation.

Figure 10:
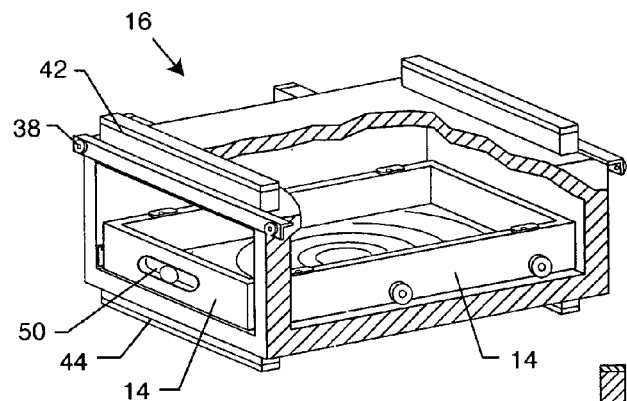
FIG. 10 is a partially sectioned and fragmented perspective view of a storage unit embodying the present invention, having balancing means incorporated therewith.
Figure 12:
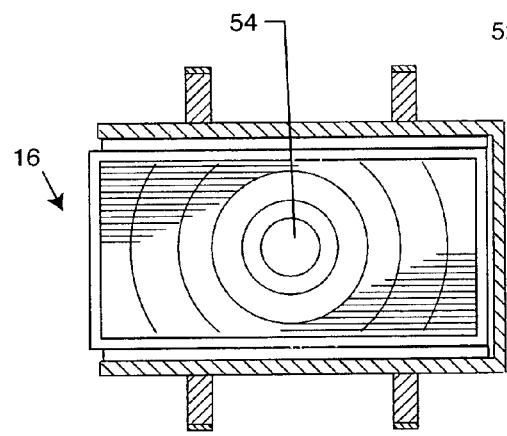
FIG. 12 is a cross-sectional view taken generally along line 12—12 of FIG. 7.
Figure 13:
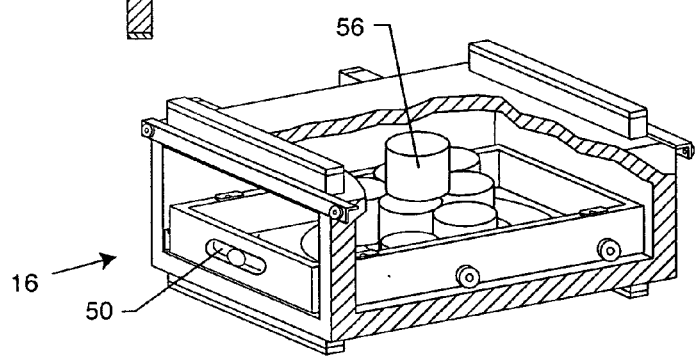
FIG. 13 is a view similar to FIG. 10, but illustrating containers within a drawer of the storage unit.

With reference to FIGS. 10 and 12, another visual means for identifying balance is illustrated. This is referred herein as the "bulls-eye" method wherein concentric circles are formed in the bottom of the storage unit 16 or drawer 14. The inner most concentric circles could be painted green, and then surrounding circles yellow, even further surrounding circles orange, and the outermost circles red. In addition, a free-floating disc or the like could be placed between the bottom panel of the storage unit 16 or drawer 14 and a clear floor such that if the storage unit 16 were unbalanced, the free-floating disk would travel into an orange or red area, indicating to the end user that the storage unit 16 was imbalanced. In this manner, as illustrated in FIG. 13, items 56 could be placed towards the center of the storage unit 16, or in a substantially uniform manner, such that the storage unit 16 would be more or less balanced.

Other means of balancing the storage unit 16, to the extent necessary, are contemplated by the present invention. For example, each storage unit should could attached thereto a movable weight which slides on a track, which may also be movable along another track, such that the movable counter weight counters the imbalance of weight within the storage unit 16 itself in both the X and Y planes. However, given the fact that the storage unit 16 moves along the tracks 20 and 22 on wheels 38, the potential for binding is minimized.

Figure 14:
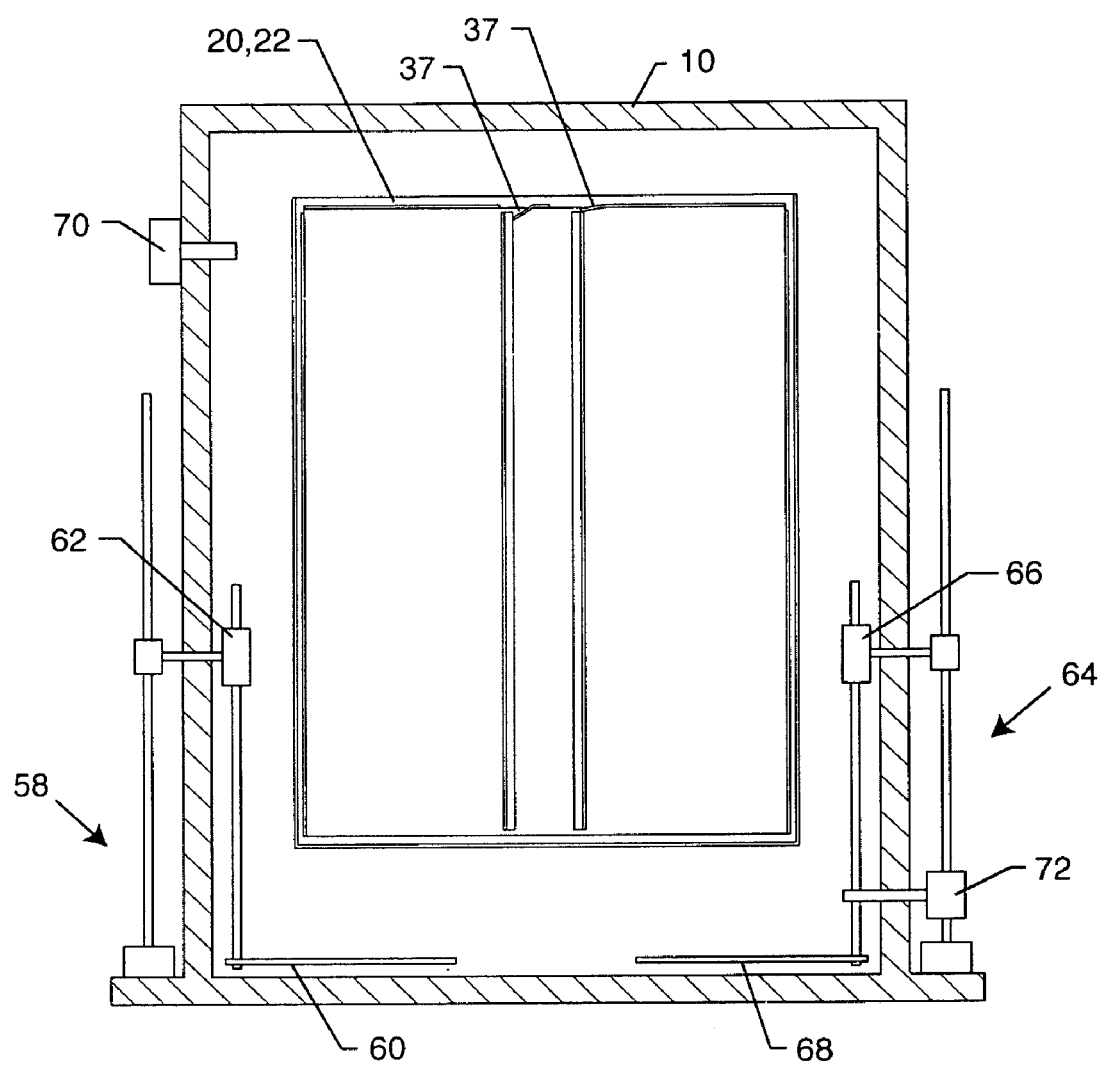
FIG. 14 is a diagrammatic view of a storage system embodying the present invention, with power-driven actuators positioned about the single track system.

With reference now to FIG. 14, the operation of the present invention with respect to the single track system will now be described. As discussed above, the tracks 20 and 22 are typically disposed within a housing and or other structure, such as a cabinet, behind a wall, which may extend into a ceiling or floor, etc. Although the tracks 20, 22 appear to be completely suspended within the structure 10, it will be understood that support members or the like hold the tracks 20 and 22 in place within the structure 10. The storage units 16, as illustrated and described above, are suspended and stacked between the parallel tracks 20, 22 so as to be at least partially supported by the tracks 20 and 22.

Actuators are used to move the storage units. Typically, as discussed above, the actuators are power-driven so as to be capable of lifting substantial weight and operated with control circuitry. However, as will be more fully discussed herein, it is also possible to have a manual back-up system.

The system includes a first vertical actuator 58 which, as will be more fully described herein, serves to lift a column of storage units. The vertical actuator includes an arm 60 which is selectively moveable over an arc, typically of 90°, so as to be positioned below the storage units, or to the side of the storage units. The vertical actuator 58 can comprise a linear actuator, such as that offered by Jaeger Industrial Co., Ltd., under the SuperTak trade name. Such linear actuators are capable of lifting 500 or even 1000 pounds. When a vertical linear actuator is utilized, a rotary actuator 62 is also required to rotate the arm 60 over its arc under and away from the storage units. Other vertical actuators are also feasible, such as those referred to as "pick and place" actuators which are capable of both vertical as well as rotary motion. The cost and design of the system may dictate whether a "pick and place" actuator or multiple actuators 58 and 62 are utilized. Similarly, a second vertical actuator 64, and if necessary a rotary actuator 66 to rotate the arm 68, is disposed on the opposite end column to lower the stacked storage units 16, as will be more fully described herein.

A horizontal actuator 70 is disposed towards an upper left portion of the system and positioned so as to extend a ram or rod inwardly to move a storage unit 16 horizontally, as will be seen and more fully described herein. Similarly, a horizontal actuator 72 is positioned in the lower right hand corner of the system so as to be positioned to push a storage unit 16 from a bottom position of one column to an adjacent column, as will be more fully described herein. This positioning, of course, relies upon a clockwise rotation or sequence of the storage units. If another sequence is desired, the actuators 58, 64, 70 and 72 are repositioned accordingly.

It will be appreciated by those skilled in the art that the system of the present invention does not necessarily need to have a certain or predefined start position or sequence. Typically, the storage units 16 travel in either a clockwise or counter-clockwise manner. The position of the storage unit 16 does not need to be placed at a start point or the like. Instead, the storage unit 16 can be moved from their current position until the desired storage unit is accessible.

Figure 15:
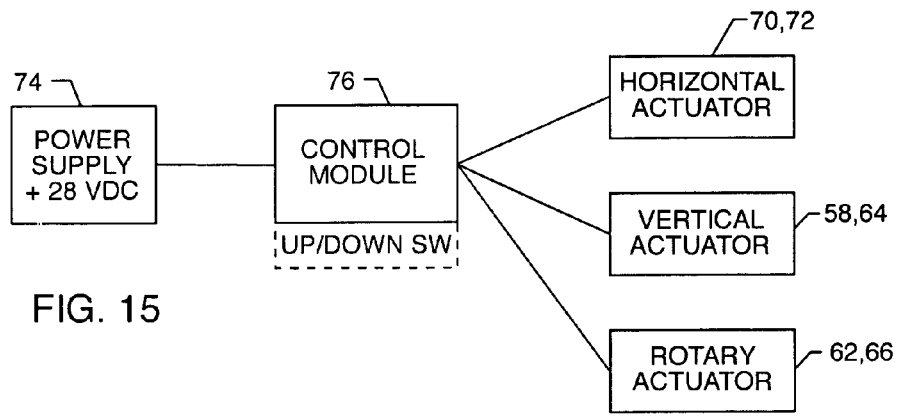
FIG. 15 is a diagrammatic view illustrating control of the power-driven actuators.
Figure 16:
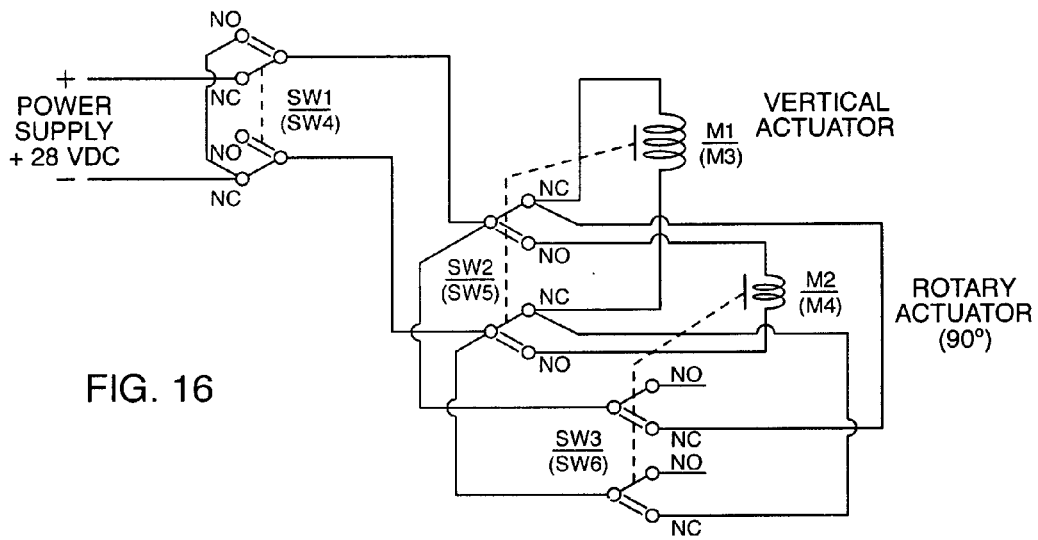
FIG. 16 is an electronic schematic illustrating the control circuitry for vertical and rotary actuators, in accordance with the present invention.
Figure 17:
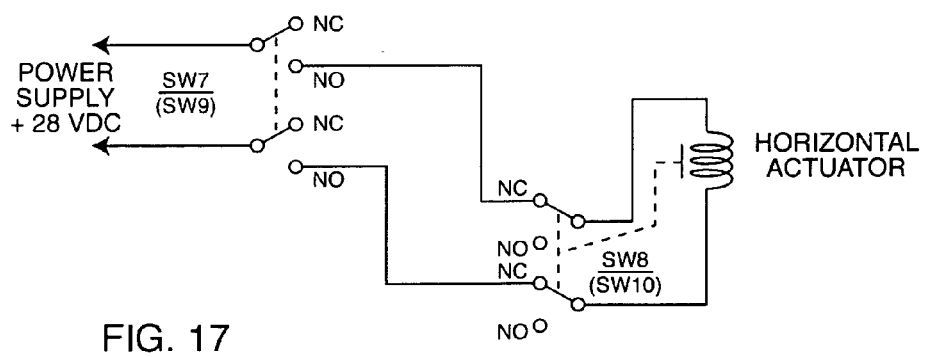
FIG. 17 is an electronic schematic of the control circuitry for operating the horizontal actuators, in accordance with the present invention.

With reference now to FIGS. 15 and 17, in a preferred embodiment, the actuators are power-driven. As such, control circuits control the timing and movement of each of the actuators 58, 64, 70 and 72. With reference now to FIG. 15, a power supply, such as a 28 volt direct current power supply 74 supplies power to a control module 76, such as the illustrated controller 18 in FIG. 1, which serves to control the horizontal actuators 70 and 72, vertical actuators 58 and 64 and rotary actuators 62 and 66, if necessary. It may be that the controller 18 includes merely a power switch which serves to power the control module 76 and cause the storage units 16 to rotate until the desired storage unit is available and accessible to the individual. Alternatively, circuitry can be implemented such that a particular storage unit 16 may be moved into a particular location, as determined by the individual. The control module 76 would then power on the actuators 58, 62, 64, 66, 70 and 72, if necessary. FIGS. 16 and 17 illustrate switches, such as the double-pole, double-throw switches which would be sequentially activated to supply power to the respective actuator. The control module 76 would determine the timing of such switch activation.

Figure 18:
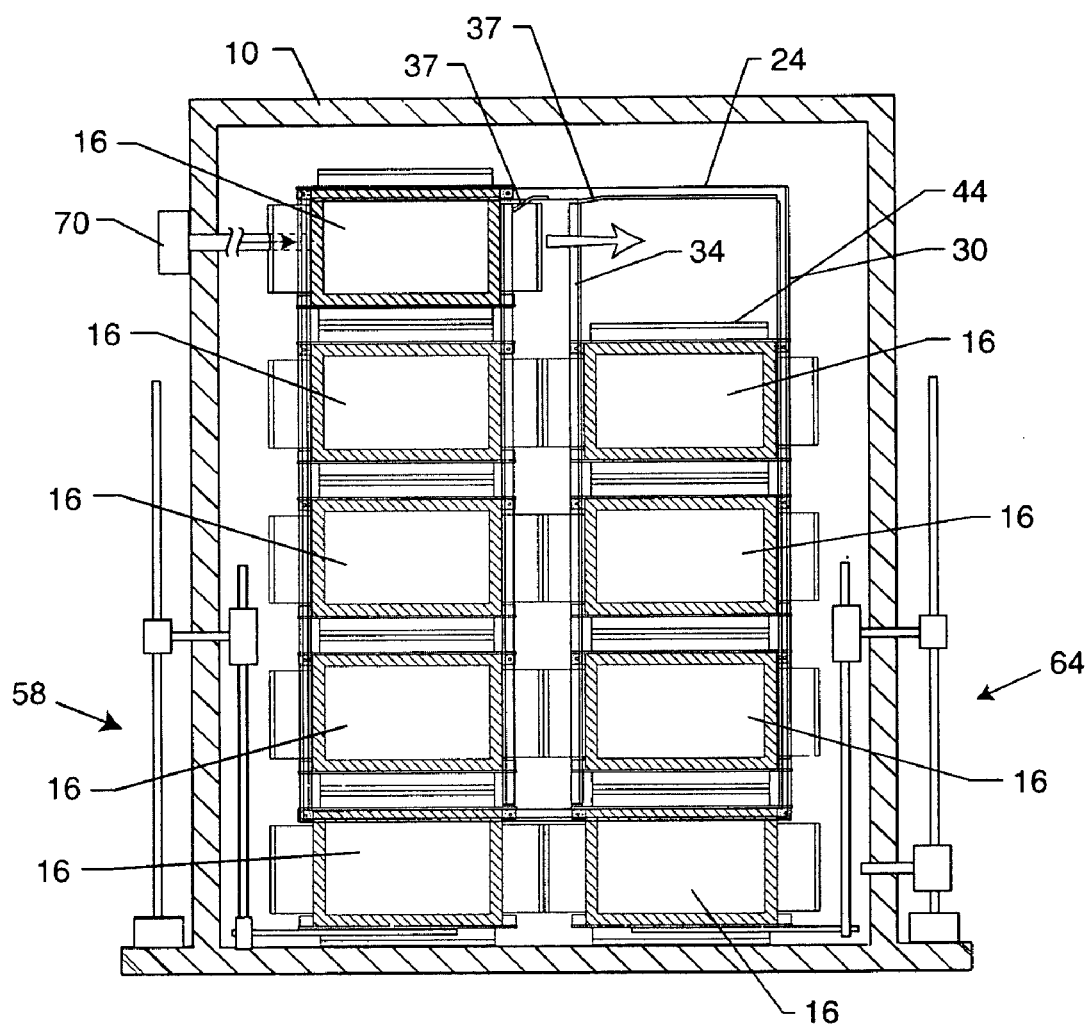
FIG. 18 is a diagrammatic view similar to FIG. 14, but illustrating two columns of storage units, and the operation of the actuators to move a top storage unit from one column to an adjacent column.
Figure 19:
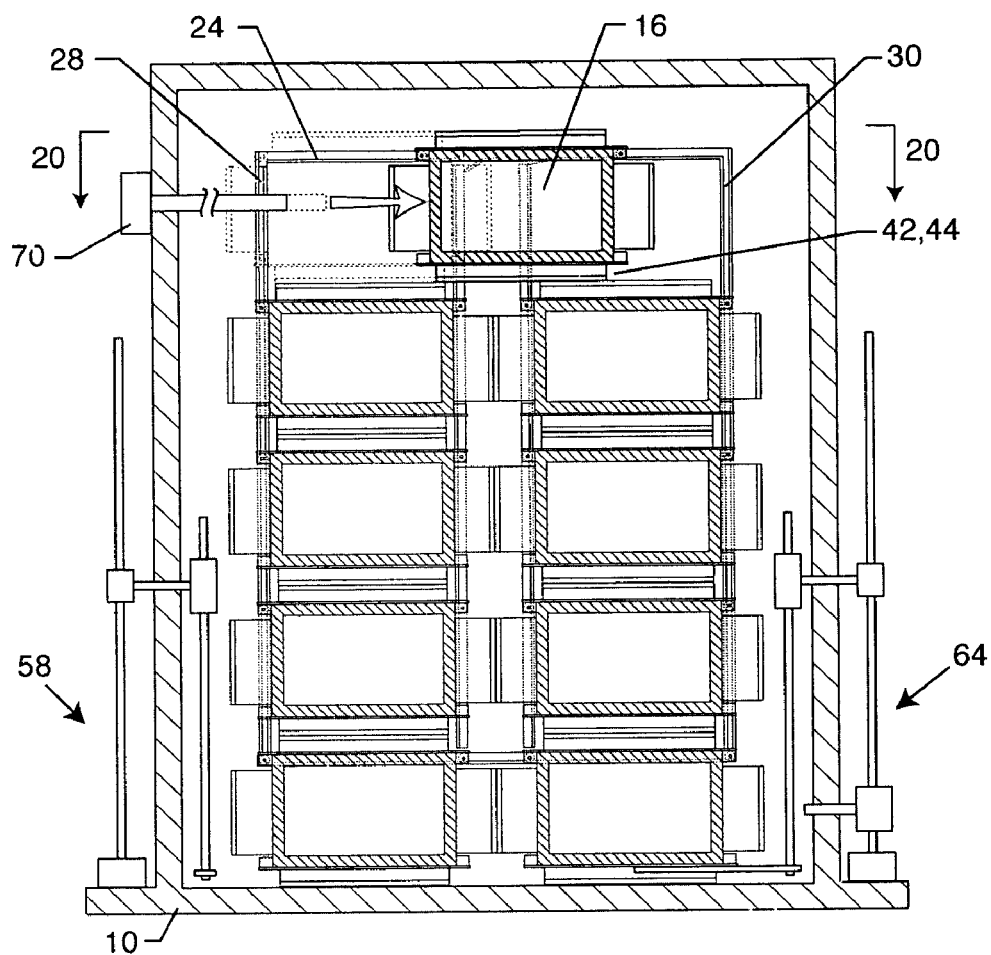
FIG. 19 is a diagrammatic view similar to FIG. 18, illustrating the top storage unit being moved.
Figure 20:
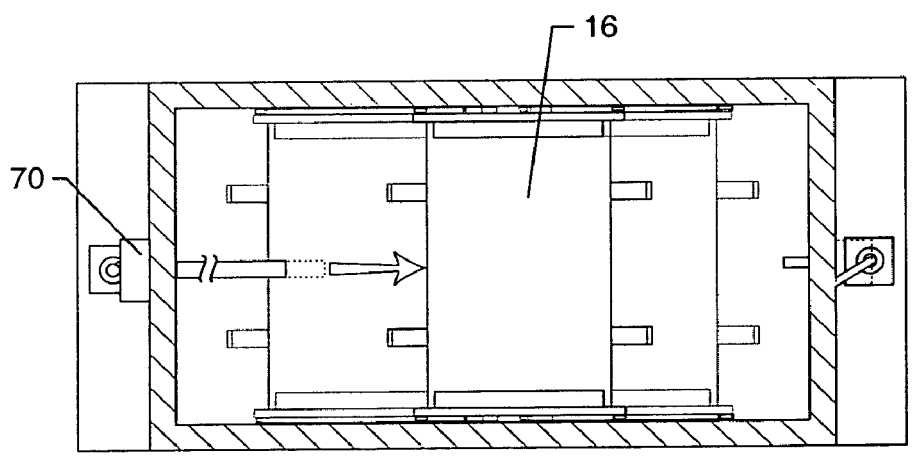
FIG. 20 is a cross-sectional view taken generally along line 20—20 of FIG. 19, illustrating the movement of the storage unit.
Figure 21:
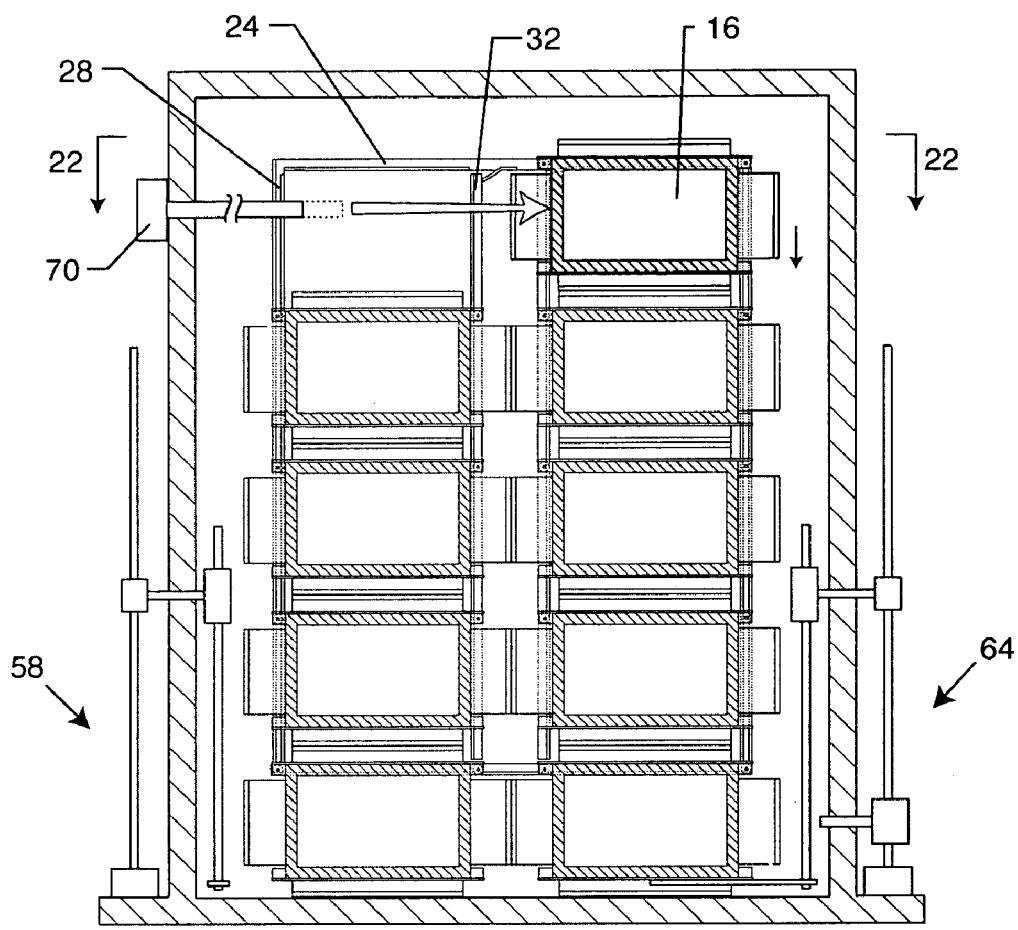
FIG. 21 is a diagrammatic view illustrating the repositioning of the storage unit from one column to another column.
Figure 22:
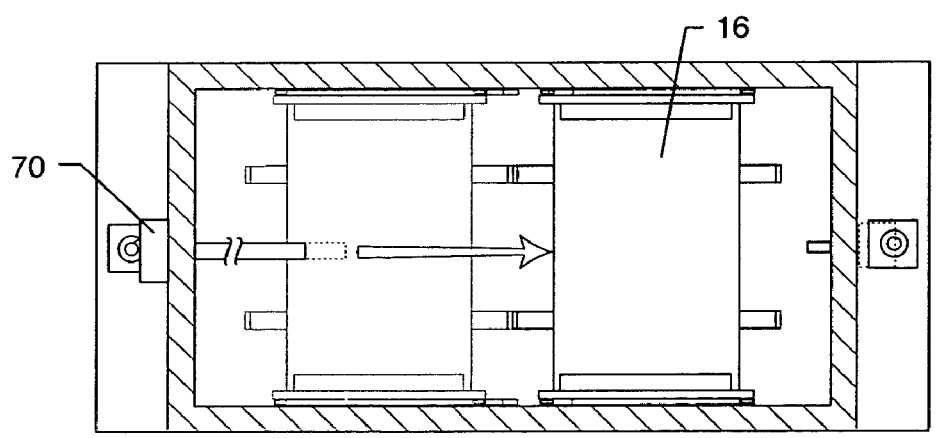
FIG. 22 is a cross-sectional view taken generally along line 22—22 of FIG. 21.
Figure 23:
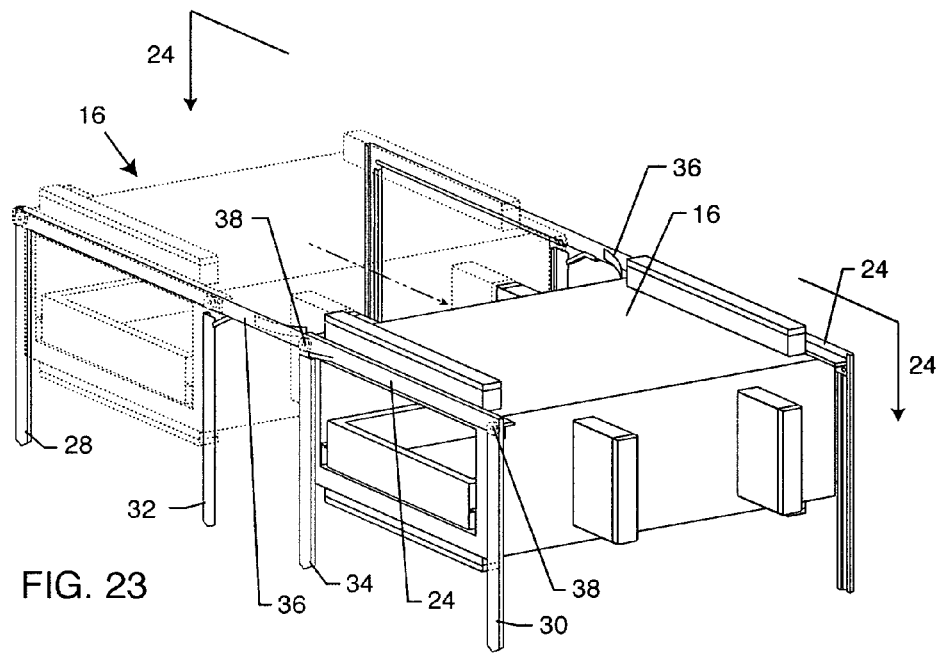
FIG. 23 is a perspective view illustrating the movement of the top storage unit from one column to an adjacent column along the single track system.
Figure 24:
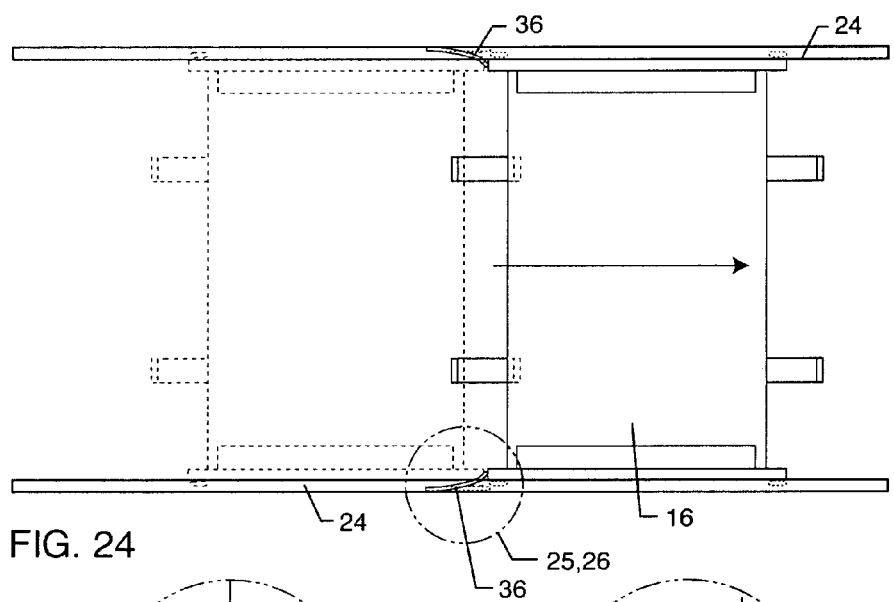
FIG. 24 is a top view of FIG. 23 taken generally along line 24—24 illustrating, the use of stops in the rails of the single track system to prevent reverse travel of the storage unit.

With reference now to FIG. 18, the operation of the system of the present invention will now be described. In the configuration illustrated, for exemplary purposes in this application, two columns having essentially ten vacancies or spaces S1–S10 are provided. Storage units 16 occupy all but one of these vacancies, as described above. It will be readily understood by those skilled in the art that regardless of the configuration of number of storage units, columns, etc., there must be one vacancy in order to sequentially move the storage unit 16. In accordance with the present invention, as will be described more fully herein, the vacancy is either present at the uppermost or lowermost position of the end columns.

In FIG. 18, a vacancy is present in the upper right hand corner or upper portion of the second column. When a user desires to have access to a storage unit 16 which is not currently available through an opening 12, the end user powers the system by depressing a button or the like, or imputing the identity of a storage unit into the system through a control module 76 or the like. In the illustrated embodiment, the storage units 16 are moved sequentially in a clockwise direction.

Accordingly, control module 76 supplies power to horizontal actuator 70, such as by activating switches SW7 and SW8. Typically, this will cause horizontal actuator 70 to extend a rod or ram outwardly into engagement with the storage unit 16 occupying space S1, as shown in FIG. 1. The rod or ram horizontal actuator 70 may be of a telescoping type so as to be able to extend outwardly, yet telescope inwardly into a relatively small space within a housing or the like. Alternatively, the rod or ram 70 may comprise a screw or any other means necessary for physically moving the storage unit 16 as needed. The storage unit 16 is moved along the upper rails 24 of the tracks 20 and 22 and partially supported by the low friction surface of spacers 42 and 44 until it is fully moved into space or vacancy S2, as illustrated in FIGS. 18–22. Ramps 37 minimize any binding effect of the wheels 38 bridging the gaps in the rails 24 created by the vertical rails 32 and 34.

At this point, the storage unit 16, now residing in space S2, is positioned at the top of the second column. Typically, the storage units 16 are stacked on to one another. This is due to the fact that the wheels 38 of the storage unit 16 travel from vertical rails 28 and 32, across upper rails 24, to the vertical rails 30 and 34 and the second column of storage units 16. In the event that the storage unit 16 moved from the first column contacts the upper most storage unit in the second column as it is moved, the spacers 42 and 44 are designed so as to enable the storage unit 16 to slide over the lower storage units 16 and into the desired position.

With reference now to FIGS. 23–26, in the single track system, a stop 36 is operably disposed on both of the upper rails 24 of the tracks 20 and 22. The purpose of the stop 36 as described above, is to prevent the storage unit 16 from traveling backwards once it has been moved into position. This is merely a precaution in the event that the overall system is not completely level, or that the storage unit 16 would reverse its course when the rod of the horizontal actuator 70 is retracted.

Figures 25, 26:
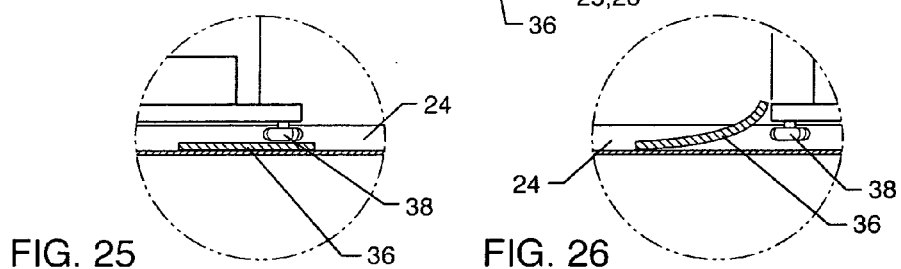
FIG. 25 is an enlarged view of area "25" of FIG. 24, illustrating the stop deflected as a wheel of the storage unit passes thereby.
FIG. 26 is an enlarged view taken generally of area "26" of FIG. 24, illustrating the stop biased outwardly to prevent reverse travel of the storage unit.

As can be seen in FIGS. 23–26, the stop 36 is typically biased away from the rail 24. In this case the stop 36 comprises a leaf spring. As the storage unit 16 is moved past the stop, as illustrated in FIG. 25, the stop 36 is deflected into and against the rail 24 to permit the wheel 38 to pass thereby. However, once the wheel 38 has passed by the stop 36, the stop 36 is biased outwardly or away from the rail 24, again, preventing rearward travel of the storage unit 16.

Figure 27:
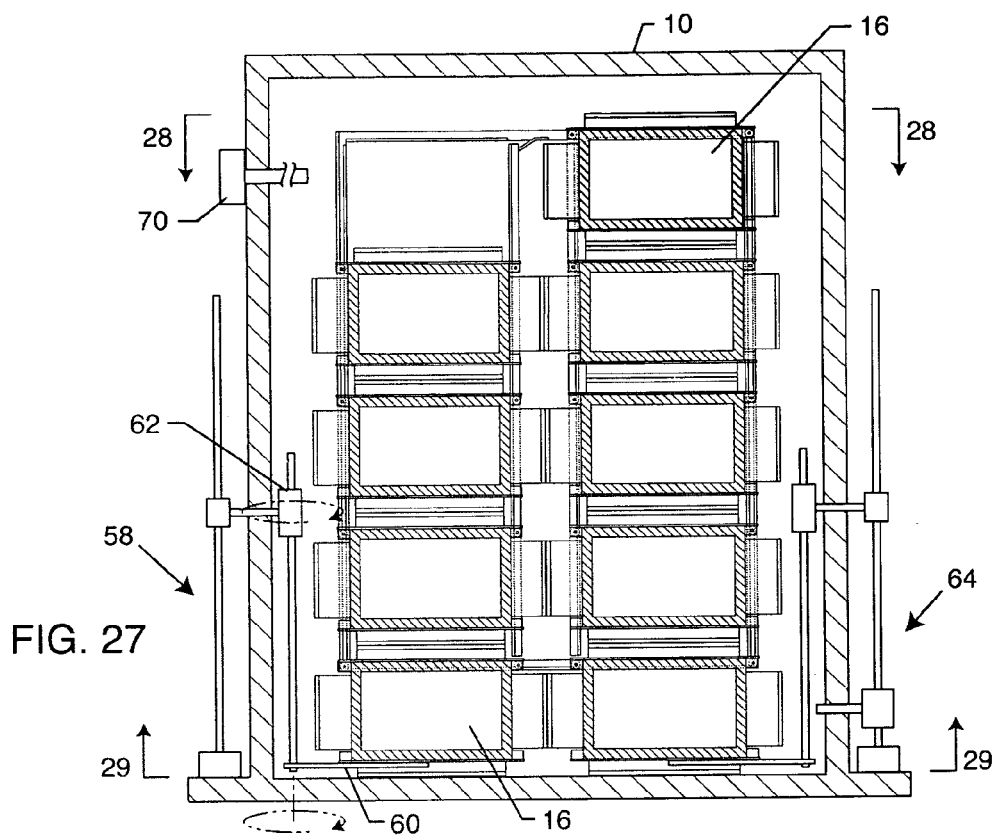
FIG. 27 is a diagrammatic view of the invention, with an actuator positioned below the first column of storage units.
Figure 28:
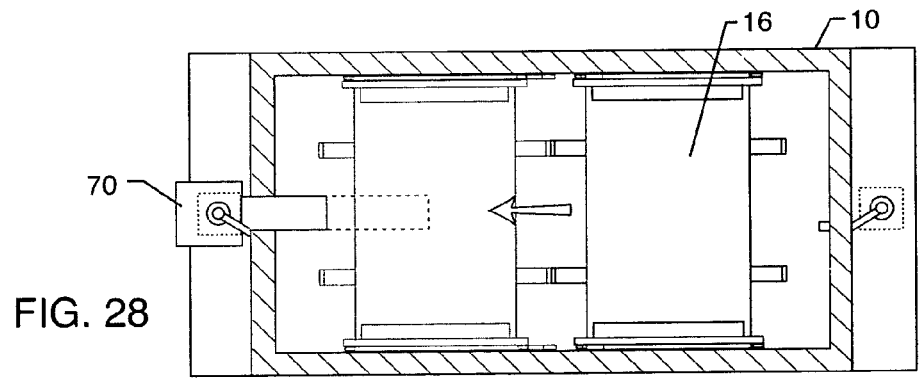
FIG. 28 is a top view taken generally along line 28—28 of FIG. 27, illustrating the retraction of a ram of an upper horizontal actuator, in accordance with the present invention.
Figure 29:
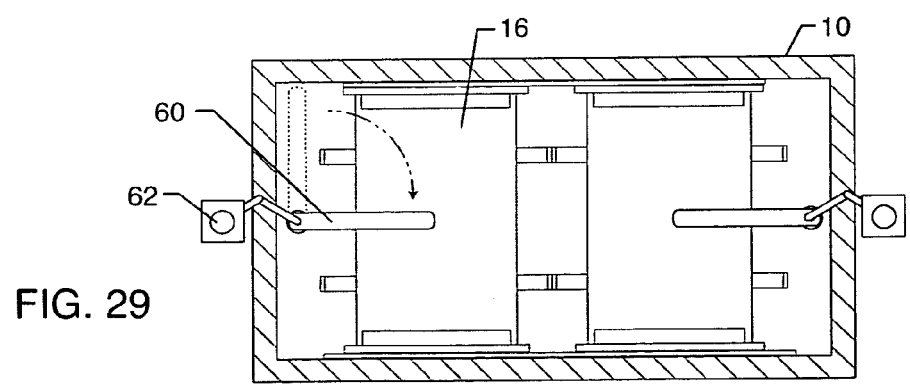
FIG. 29 is a cross-sectional view taken generally along line 29—29 of FIG. 27, illustrating the positioning of a swing arm by a vertical actuator, in accordance with the present invention.

With reference now to FIGS. 27–29, after the storage unit 16 has been moved from the top of the first end column to its adjacent column, in this case the second end column, the control module 76 activates vertical actuator 58 such that the arm 60 is swung approximately 90°, lowered and repositioned, so as to rest under the bottommost storage unit 16 of the first column. In the event that the vertical actuator 58 includes a rotary actuator 62, this would be done, for example, by powering switches SW1, SW2 and SW3, so as to power the rotary actuator M2.

Figure 30:
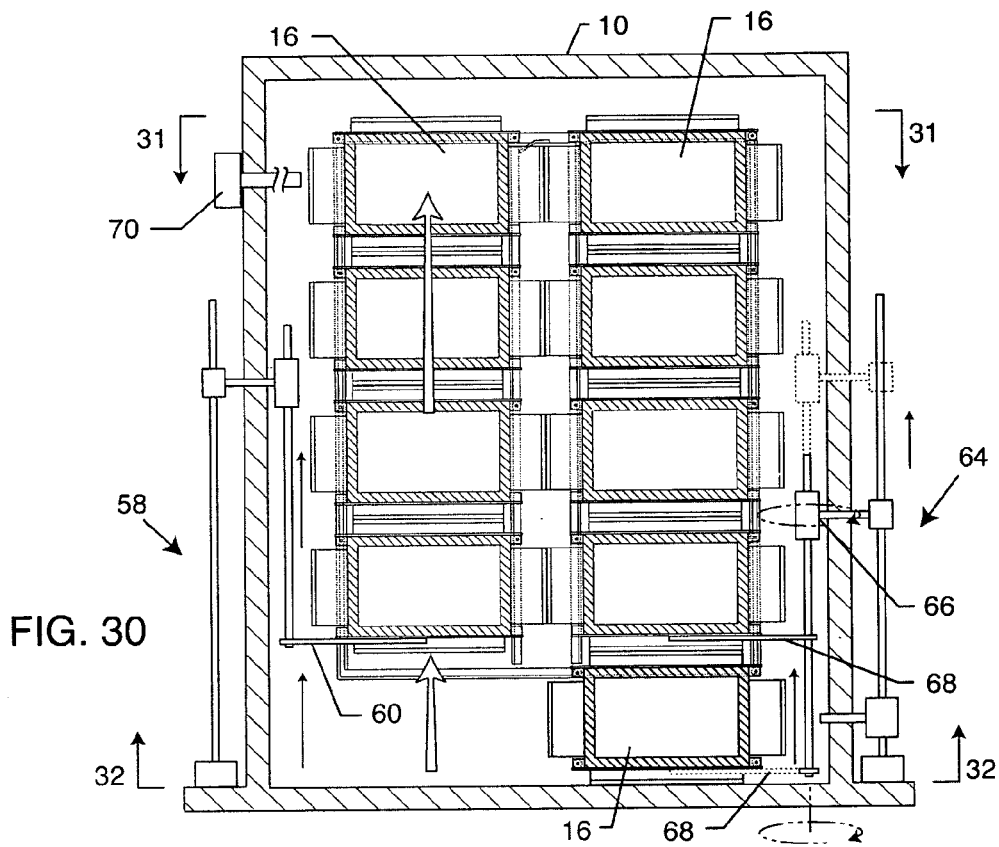
FIG. 30 is a cross-sectional diagrammatic view illustrating a vertical actuator lifting the first column of storage units, in accordance with the present invention.
Figure 31:
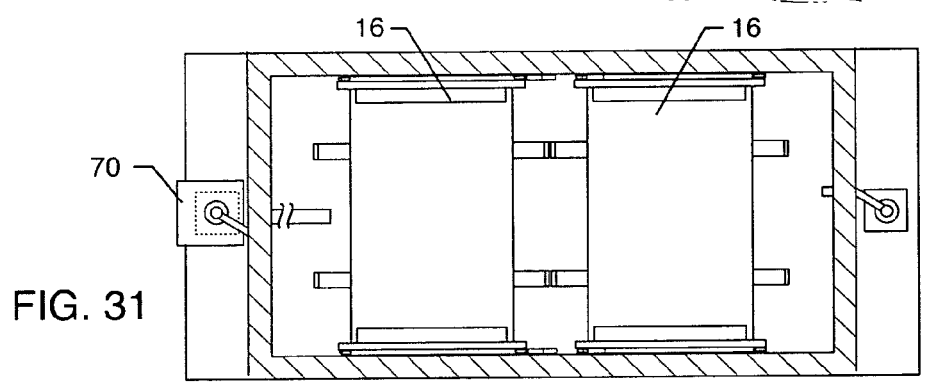
FIG. 31 is a top view taken generally along line 31—31 of FIG. 30 illustrating the top two storage units of the adjacent columns.
Figure 32:
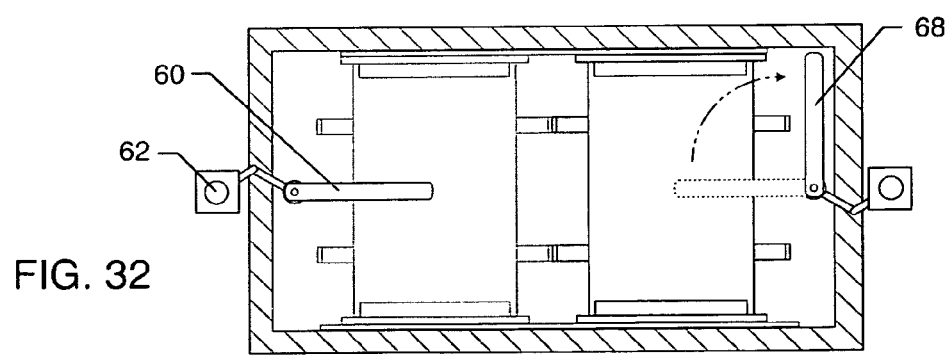
FIG. 32 is a bottom view taken generally along line 32—32, illustrating movement of another swing arm by an actuator, in accordance with the present invention.

With reference now to FIGS. 30 and 31, once the arm 60 is positioned under the storage unit 16 occupying space S7, with the vacancy in space S1, the vertical actuator 58 is activated to lift the first column of stacked storage units 16 such that the uppermost storage unit 16 now resides in space S1, creating a vacancy in space S7, as illustrated.

Figure 33:
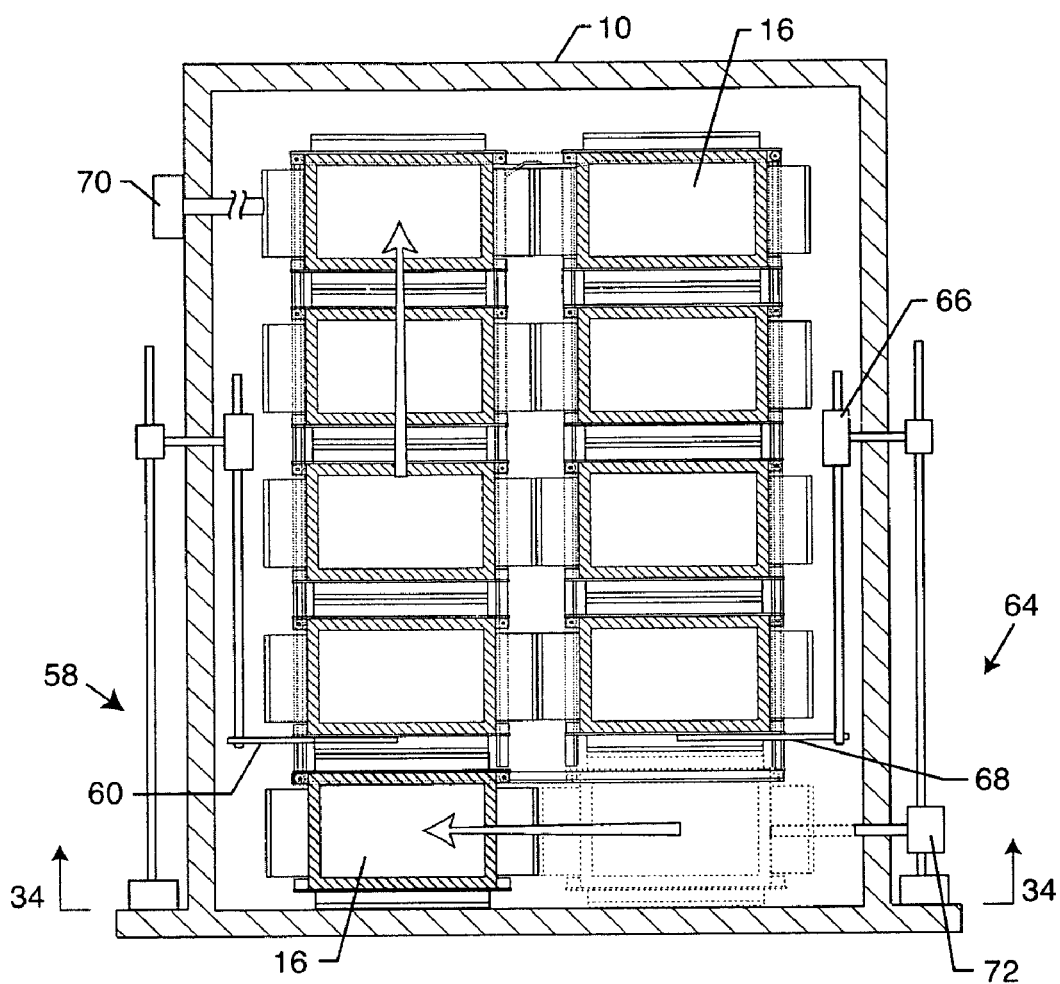
FIG. 33 is a cross-sectional diagrammatic view of the system of the present invention, illustrating the supporting of all but the bottom storage unit of the second column, and the repositioning of the bottom storage unit from one column to another column.

With reference to FIGS. 30–33, preferably simultaneously, or immediately thereafter, the second vertical actuator 64 rotates the second swing arm 68, as necessary, from under the lowermost storage unit in the second column, such as by using the rotary actuator 66 to rotate the arm 68 90 degrees. The vertical actuator 64 then lifts the arm 68 and the rotary actuator 66 repositions the arm 68 under the storage unit 16 immediately above the lowest storage unit 16, as illustrated in FIGS. 30 and 33.

Figure 34:
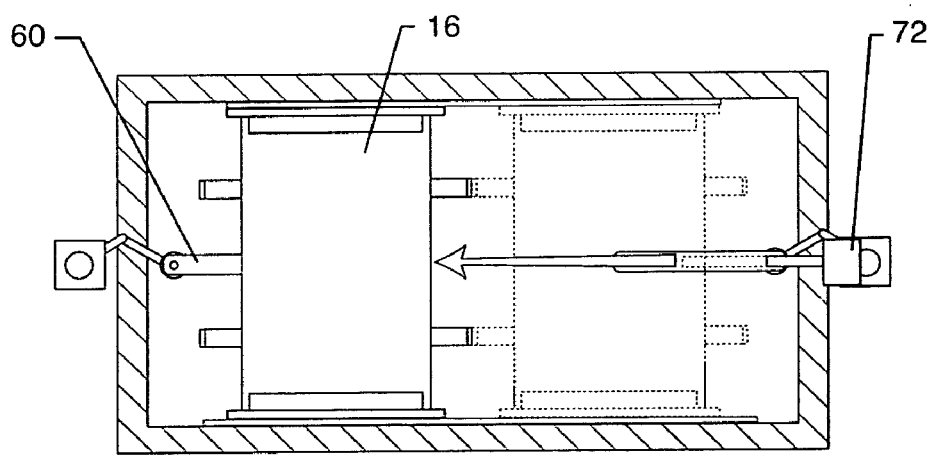
FIG. 34 is a bottom view taken generally along line 34—34, illustrating the movement of the bottom storage unit from one column to an adjacent column.

With reference now to FIGS. 33 and 34, the second vertical actuator 64 either holds the stack of storage units 16 in the second column, or slightly lifts the column, with the exception of the bottommost storage unit 16. The second horizontal actuator 72 is now activated. Referring back to FIGS. 15 and 17, this occurs when control module 76 powers the necessary switches, such as switches SW9 and SW10. A rod or ram is then extended outwardly, as shown in FIG. 33, to move the lowermost storage unit 16 from space S6 in the second column to space S7 in the adjacent first column. Stops 36 may be used in the bottom horizontal rail 26, if necessary, to prevent the storage unit 16 from reversing its course, as discussed above.

Figure 35:
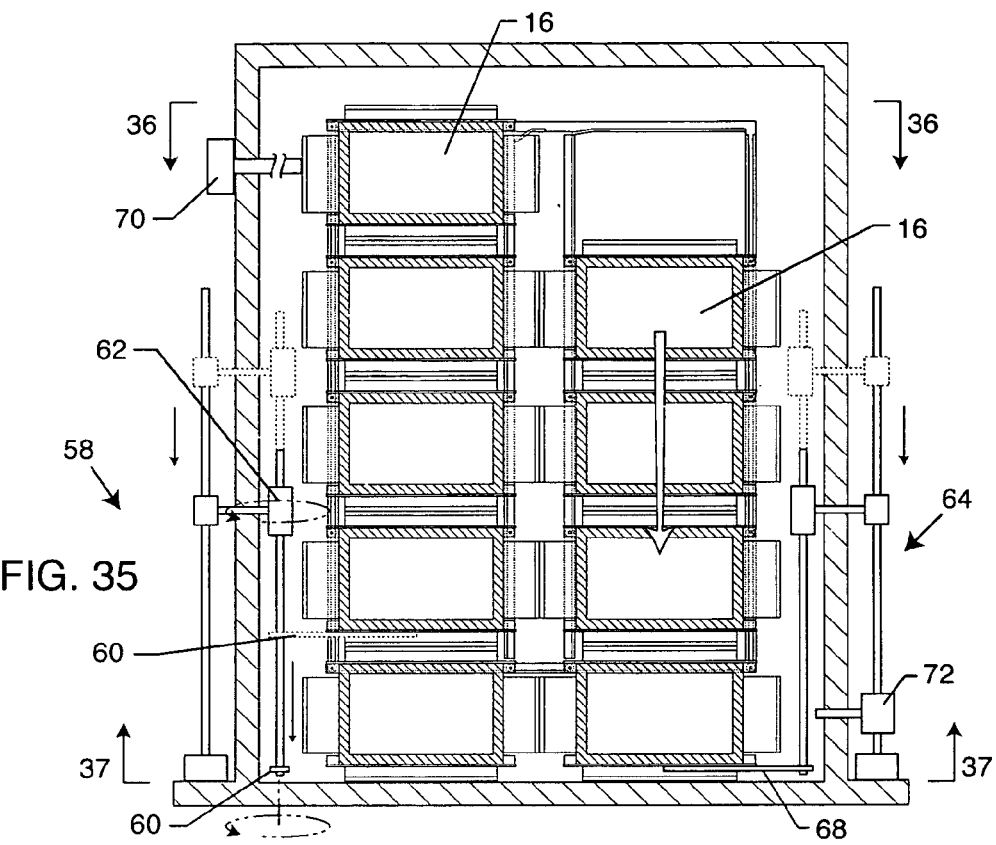
FIG. 35 is a cross-sectional diagrammatic view illustrating the lowering of the storage units in the second column to create a vacancy in a top position thereof.
Figure 36:
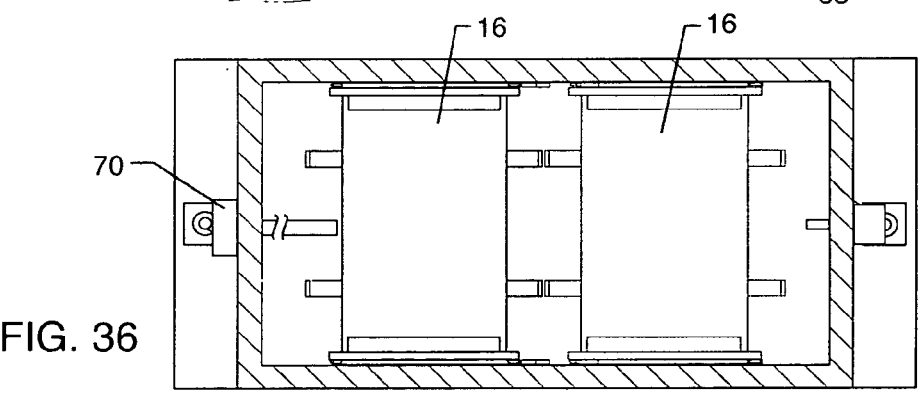
FIG. 36 is a top view taken generally along line 36—36, illustrating the position of the storage units in the adjacent columns.
Figure 37:
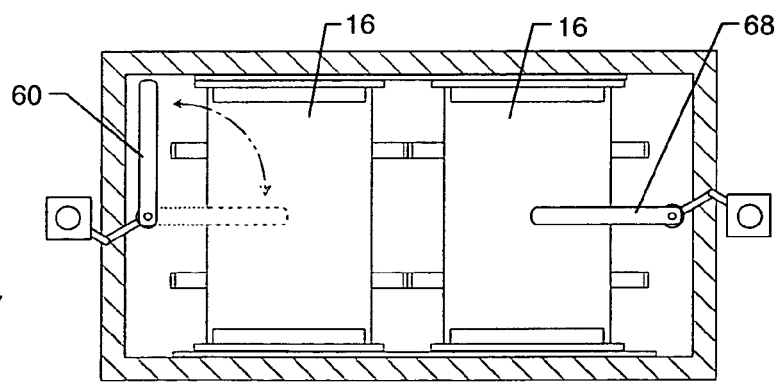
FIG. 37 is a bottom view taken generally along line 37—37 of FIG. 35, illustrating the positioning of the swing arms of the respective actuators.

Once the storage unit 16 has been moved into the open vacancy at the bottom of the first column, the second column of stacked storage units is lowered, as illustrated in FIG. 35. This can be done using the control module 76 and vertical actuator switches SW4 and SW5 to activate the vertical actuator M3. This creates a vacancy in space S2, similar to the situation illustrated in FIG. 18. Preferably, simultaneously, or immediately thereafter, vertical actuator 58 is activated so as to rotate arm 60 from under the second to the bottom storage unit 16 to either an at rest position as illustrated in FIGS. 35 and 37, or under the lowermost storage unit end space S7. The process then repeats itself until the desired storage unit 16 is presented within the desired open space 12 for access by the end user.

Figure 38:
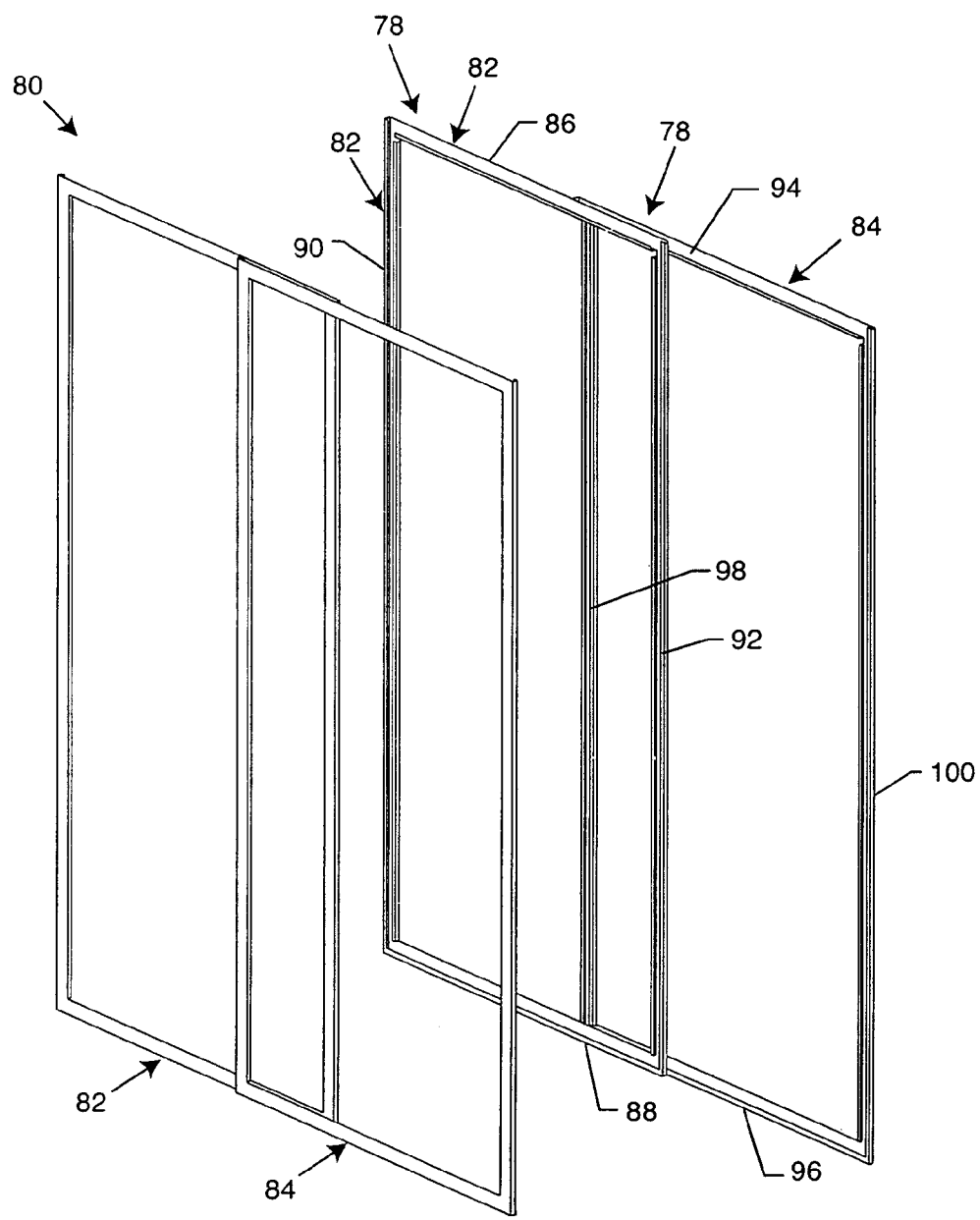
FIG. 38 is a perspective view of a dual track embodying the present invention.
Figure 39:
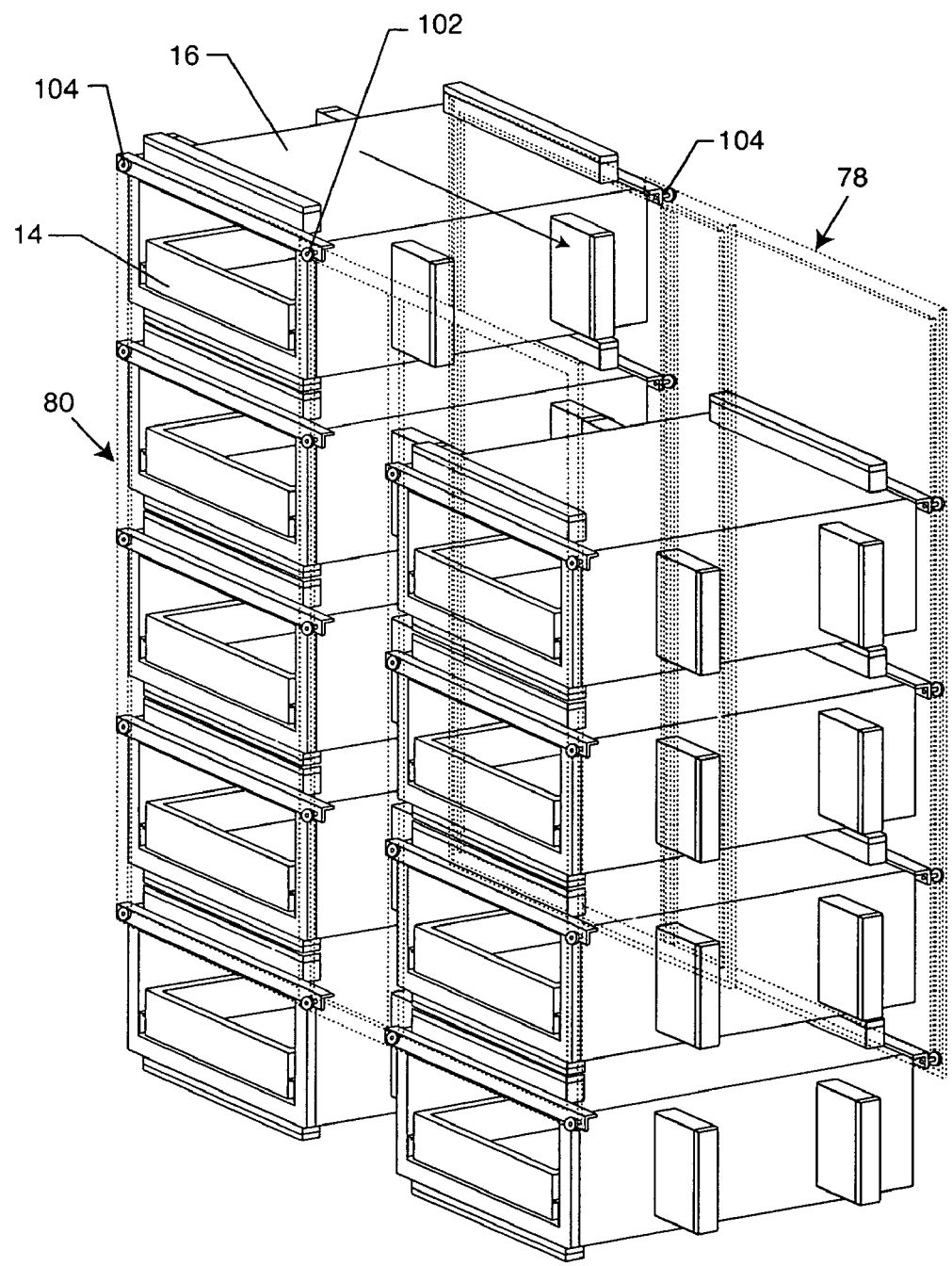
FIG. 39 is a perspective view of a plurality of stacked storage units operably connected to the dual track, in accordance with the present invention.

With reference now to FIGS. 38 and 39, a "dual track" embodiment of the present invention is illustrated and will now be described. The dual track comprises first and second sets of tracks 78 and 80 which are substantially similar mirror images of one another, and spaced apart in generally parallel relation to one another approximately the width or length of a storage unit. Each track 78 and 80 is comprised of a first rail 82 in a first plane, and a second rail 84 in a second plane so as to be in a slightly overlapping arrangement with the first rail 82, as illustrated in FIG. 38. Essentially, each rail 82 and 84 form a generally circular path. That is, the first rail 82 includes upper and lower rails 86 and 88, as well as vertical side rails 90 and 92. Similarly, the second rail 84 includes upper and lower rails 94 and 96 as well as vertical side rails 98 and 100. Each rail is generally circular, so as to be continuous and endless, such that the wheels of the storage unit 16 ride continuously within the rails 82 and 84, as will be more fully described herein. As mentioned above, the second track 80 is substantially similar to the first track 78 in structure and function.

As illustrated in FIG. 39, multiple columns of multiple storage units 16 stacked on one another operably engage the opposing tracks 78 and 80, in accordance with the present invention. The sequence of movement, and the actuators 58, 64, 70 and 72 to selectively move the storage units 16 are essentially as described above with respect to the "single track" embodiment.

Figure 40:
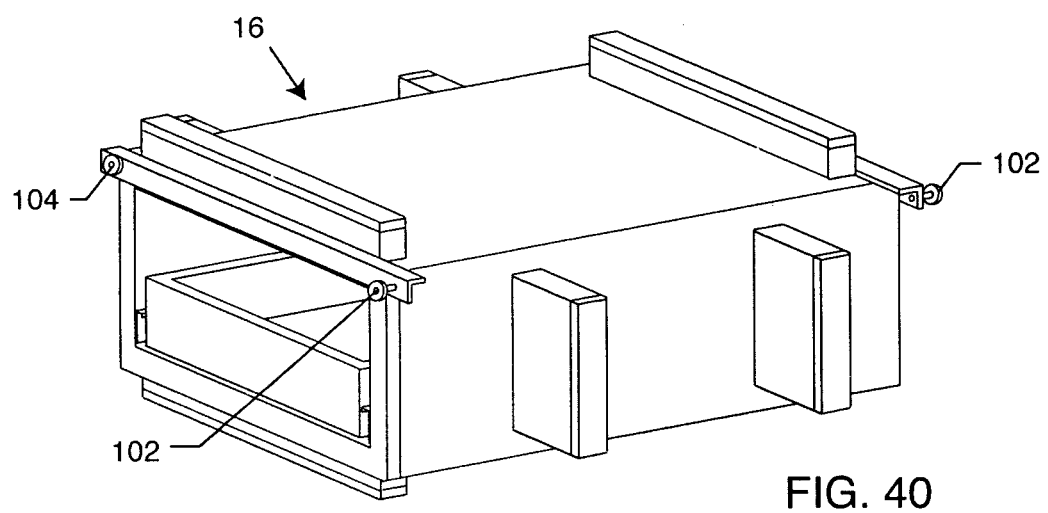
FIG. 40 is a perspective view of a storage unit used in the dual track embodiment of the present invention, illustrating sets of wheels extending therefrom.
Figure 41:
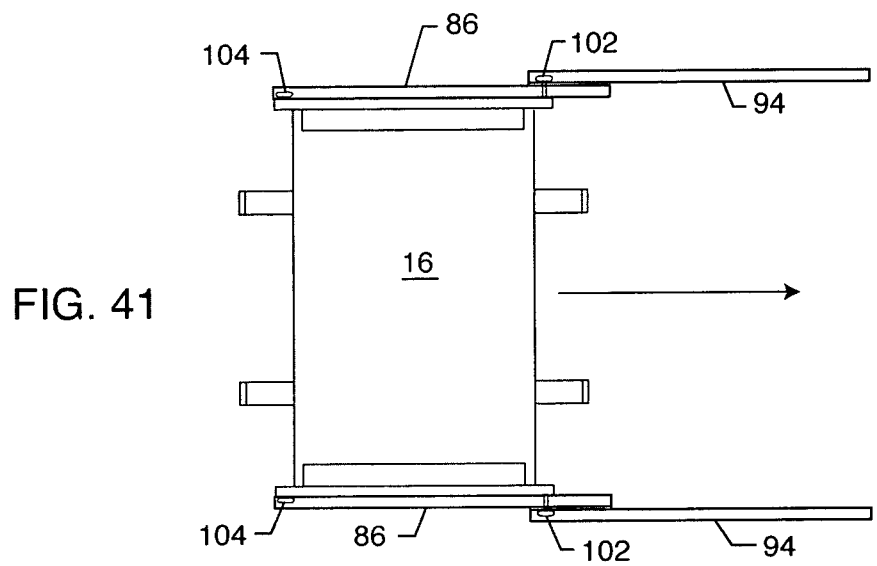
FIG. 41 is a top view illustrating a first set of wheels of the storage unit engaged with a first rail of the dual track.
Figure 42:
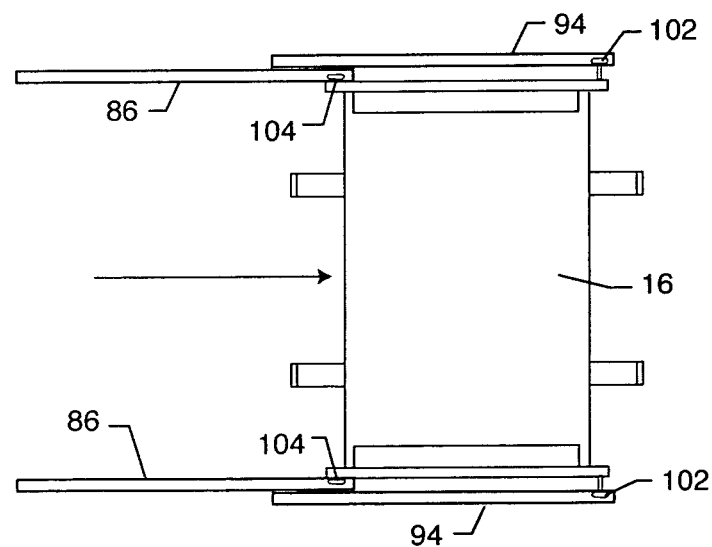
FIG. 42 is a top view illustrating a second set of wheels of the storage unit engaged with a second rail of the dual track.
Figure 43:
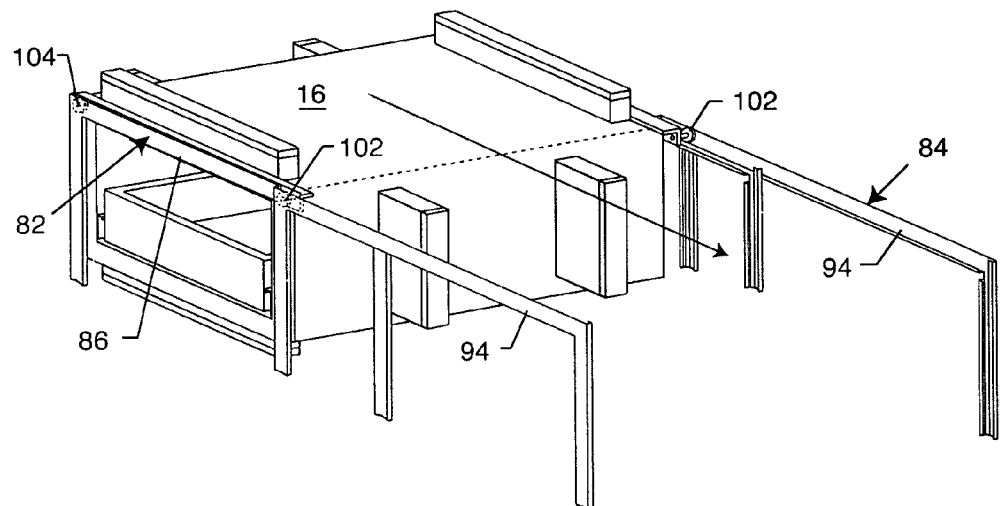
FIGS. 43 and 44 are perspective views illustrating movement of the storage unit along the dual track rails.
Figure 44:
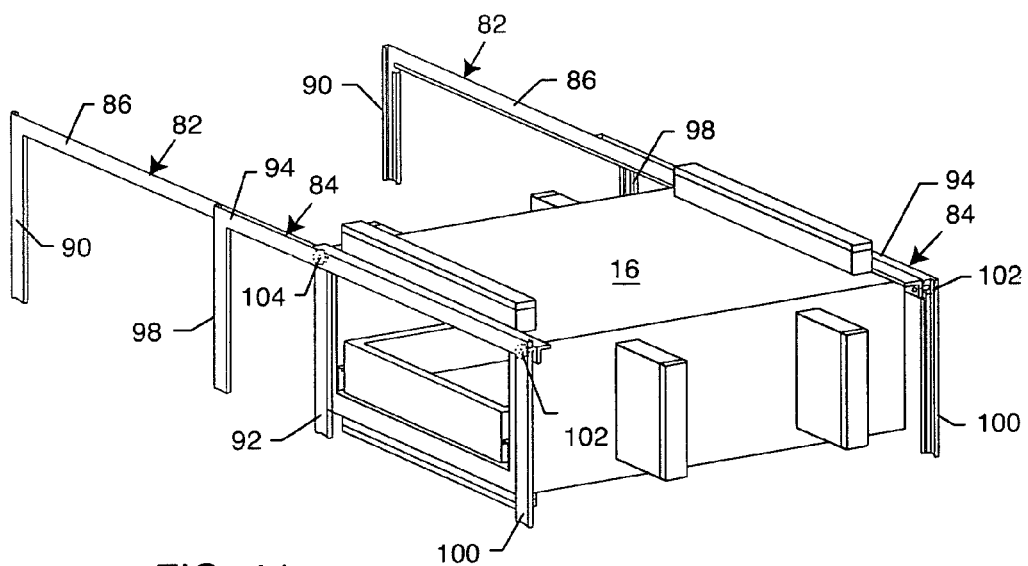

With reference now to FIGS. 40–42, an exemplary storage unit 16 used in this embodiment is illustrated. It will be noted that the storage unit 16 has two sets of wheels, 102 and 104, each set extending outwardly from the storage unit 16 a different distance. In the illustrated embodiment, wheels 102 on one side of the storage unit 16 extend out farther than the wheels 104 on the opposite side of the storage unit 16. Each set of wheels 102 and 104 reside and travel within a separate rail 84 and 82 of the track 78 or 80, as illustrated. Thus, the front wheels 102 travel in track or rail 84, including sub-rail portions 94, 96, 98 and 100. The back wheels 104 travel in the second set of tracks or rails 82, including sub-rail sections 86, 88, 90 and 92. As the rails 82 and 84 are in adjacent planes, the wheels 104 and 102 extend from the storage unit 16 different distances so as to engage their respective rail 82 or 84. This will be seen in FIGS. 43 and 44, wherein wheels 102 are engaged with the upper portion 94 of rails 84 while the opposite wheels 104 remain engaged with the upper portion 86 of rails 82 while the storage unit 16 is moved from one column to a vacancy in an adjacent column. When traveling downwardly, the first set of wheels 102 travel downwardly on vertical rail section 100 of rail 84, or rails 84 while the second set of wheels 104 travel down vertical rail segments 92 of rails 82. When moving horizontally across the bottom of the tracks 78 and 80, outer wheels 102 engage with rail sections 96, while the inner wheels 104 engage sections 88. When moving upwardly, the outer wheels travel along rail segments 98 of rail 84, while the inner wheels 104 travel along vertical rail segments 90 of rails 82. Thus, the wheels 102 and 104 are in continuous travel and engagement with each respective rail 82 and 84 while the storage 16 is moved into the various spaces S1–S10 of the columns.

With reference back to FIG. 15, the system of the present invention, whether it be a single track or dual track embodiment is typically controlled electronically using control module 76 to power the various actuators in a timed sequence so as to move the storage unit 16, as described above. This requires a power supply 74, typically in the form of a direct current voltage. Thus, a transformer or the like is typically used to transform the 120V or 240V (or 12 volts or 24 volts, if available) alternating current voltage to the appropriate direct current voltage. In the event of a power outage or the like, a battery back-up system may be used to power the control module 76 and actuators 58, 62, 64, 66, 70 and 72. Such a battery can be built into the system and periodically or continuously recharged, or one or two twelve volt automobile batteries may be connected to the system.

Figure 45:
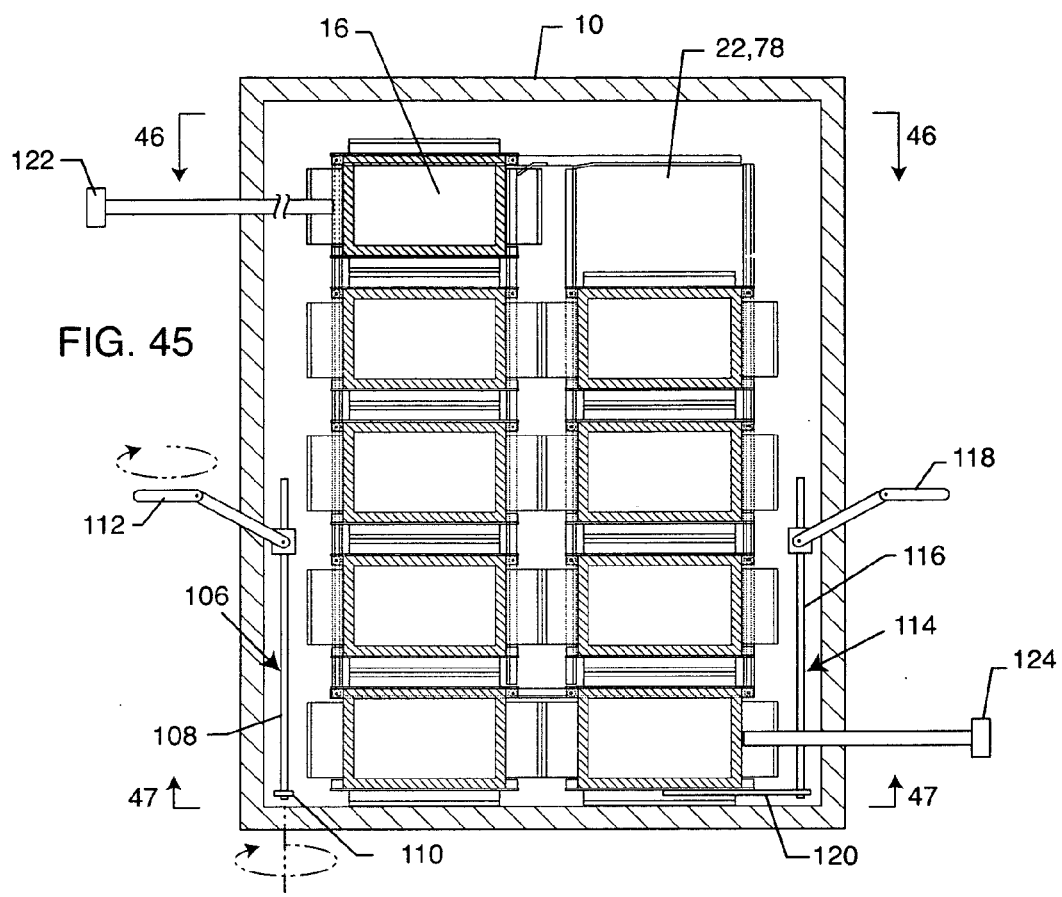
FIG. 45 is a cross-sectional diagrammatic view of the present invention, utilizing a manually operated actuating system, in accordance with the present invention.
Figure 46:
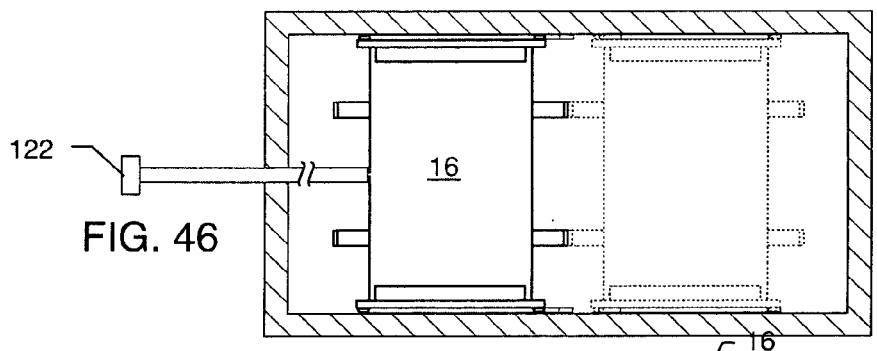
FIG. 46 is a top view taken generally along line 46—46 of FIG. 45.
Figure 47:
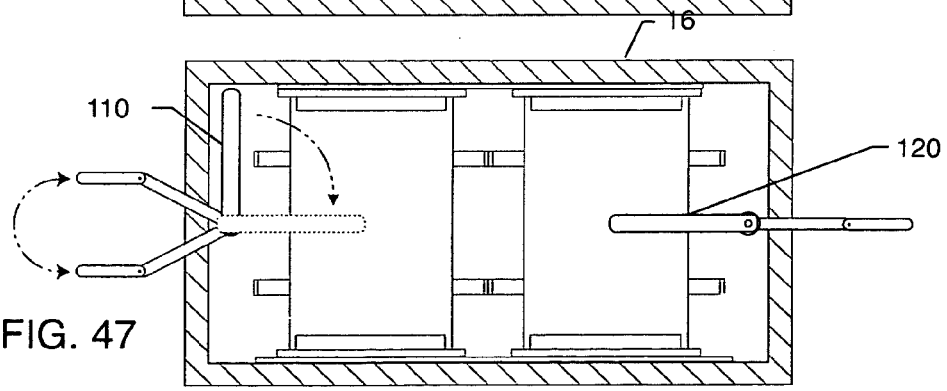
FIG. 47 is a bottom view taken generally along line 47—47 of FIG. 45.
Figure 48:
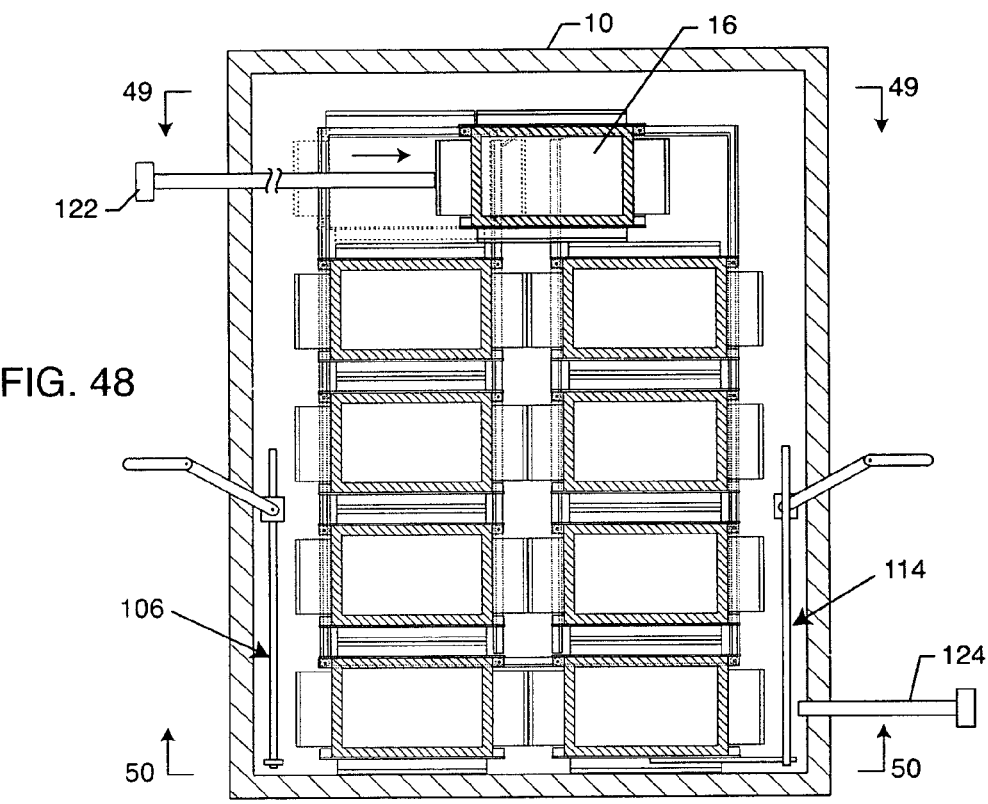
FIG. 48 is a diagrammatic view illustrating the movement from one column to an adjacent second column, in accordance with the present invention.
Figure 49:
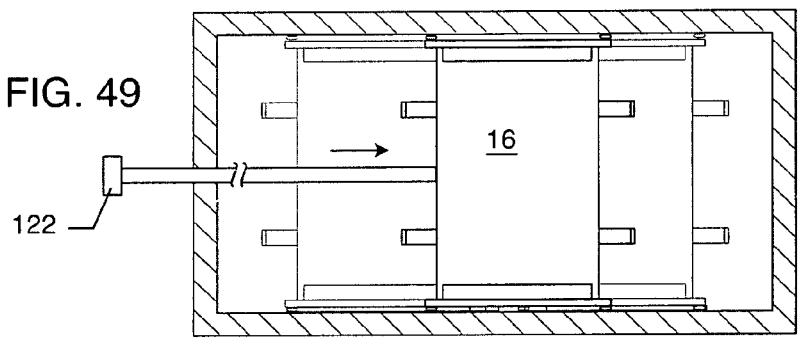
FIG. 49 is a top view taken generally along line 49—49 of FIG. 48.
Figure 50:
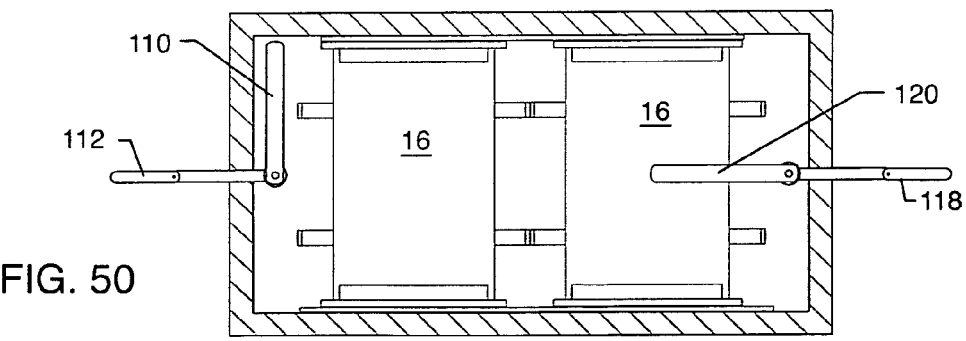
FIG. 50 is a bottom view taken generally along line 50—50 of FIG. 48.

Alternatively, the system can rely upon manual movement of the storage units 16. Such is illustrated in FIGS. 45–64. A plurality of storage units 16 are stacked upon one another in multiple columns within a structure 10 as described above. The structure 10 may be a housing or built within walls and ceilings or spaces within houses and business establishments or the like. In any event, access must be had to the sides of the end columns, as illustrated in FIG. 45. It will be understood by those skilled in the art that the manual system can be a separate system entirely, or be incorporated into the power-driven system described above, but used in emergency situations where power is not available to drive the power-driven actuators. As such, the manual system will be described herein as if completely separate from the power-driven actuators, although this is not necessarily the case.

A vertical actuator 106 is operably positioned at the lower left hand corner, or the bottom of the first end column. The vertical actuator 106 includes a rod or screw 108 and an arm 110. The handle or lever 112 is used to rotate the arm 110, such as by rotating the rod 108, and lifting the rod 108 and arm 110. Such may be accomplished by simple mechanical advantage, using lever principles. However, as the storage units 16 may have a considerable amount of aggregate weight, the vertical actuator 106 may take the form of a screw lift or hydraulic lift or jack. A similar vertical actuator 114 is positioned on the lower portion of the opposite end column, as illustrated in FIG. 45. Such would include a rod or screw 116, a handle or lever 118, as well as a swingable arm 120.

The handles or levers 112 and 118 extend through the structure 10 into operable engagement with the vertical actuator 106 and 114, respectively. Similarly, the passageway is available for the insertion of rods 122 and 124 so as to move the storage unit 16 from a top position of an end column to a top position in a vacancy of an adjacent column and from one bottom position of a column to another, respectively.

With reference now to FIGS. 45–52, in the manual system, rod 122 is inserted so as to be in engagement with the top storage unit 16 in the end column, and push the storage unit 16 along the single or dual tracks to the vacancy (in this case space S2) of the adjacent column, as illustrated. Vertical actuator 106 is then used to rotate the arm 110, as necessary to an at rest position so as to be insertable underneath the lower most storage unit 16 of the left end column.

Figure 51:
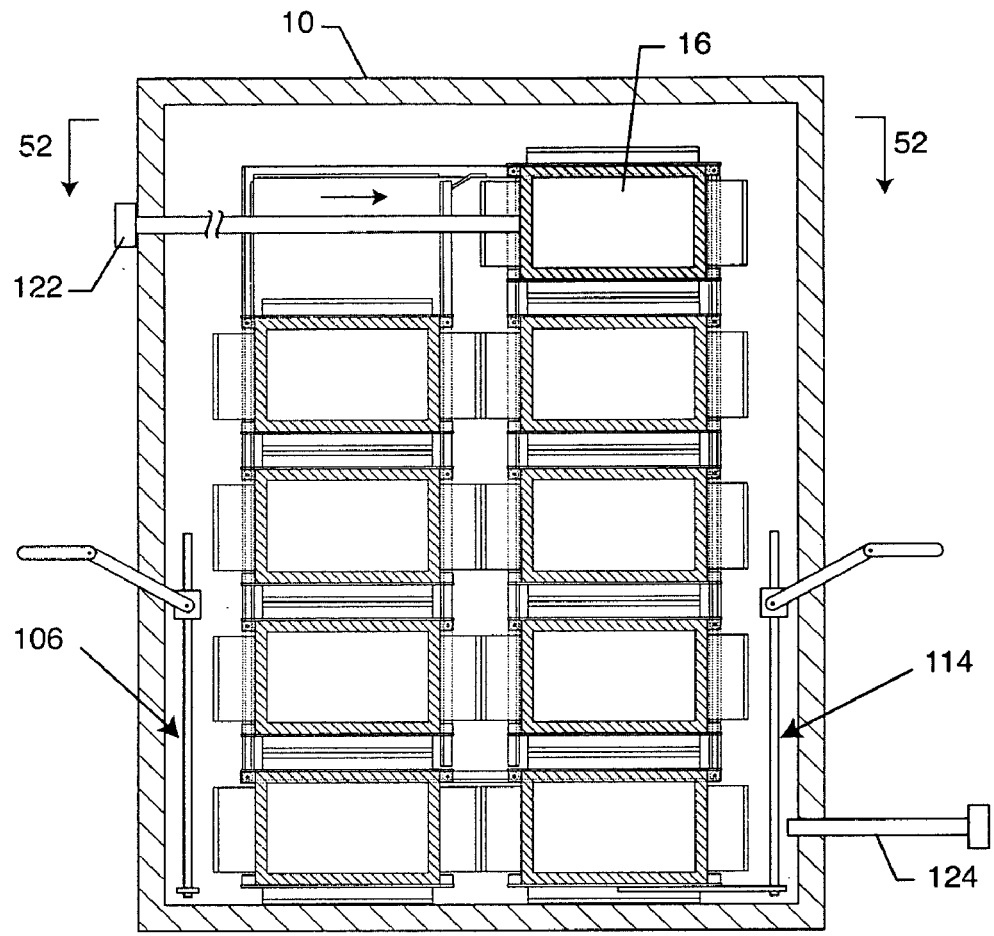
FIG. 51 is a diagrammatic view, illustrating the final placement of the top storage unit from one column to an adjacent column, in accordance with the present invention.
Figure 52:
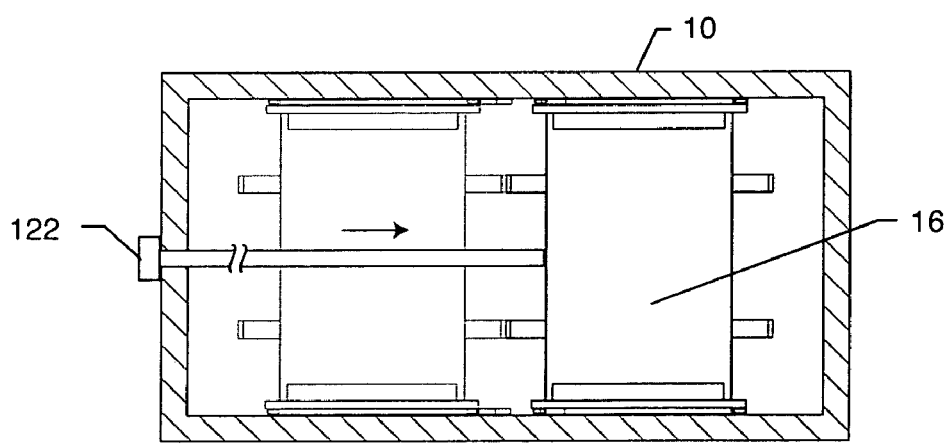
FIG. 52 is a top view taken generally along line 52—52 of FIG. 51.
Figure 53:
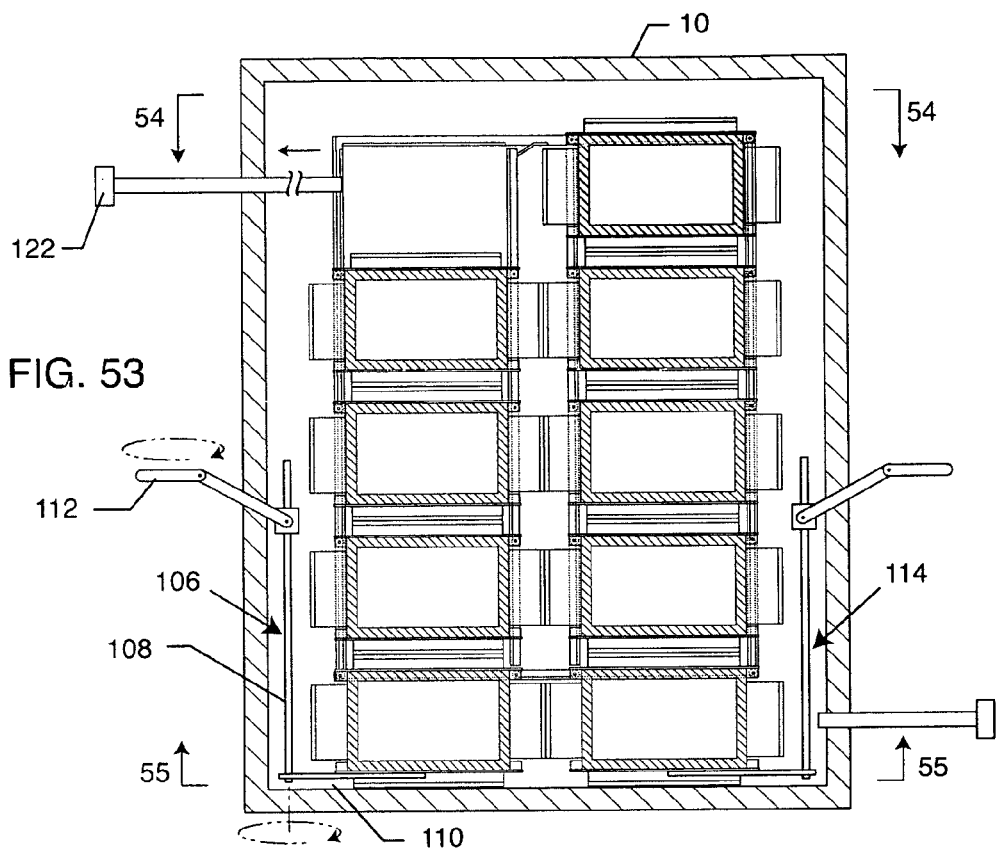
FIG. 53 is a cross-sectional diagrammatic view illustrating placement of a swing arm under the storage units of the first column in accordance with the present invention.
Figure 54:
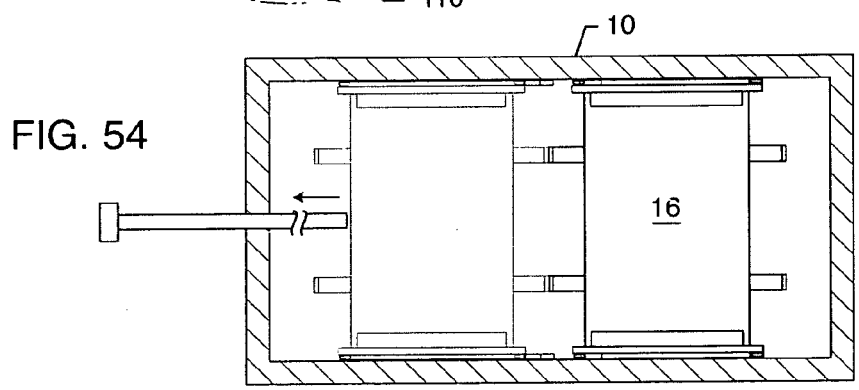
FIG. 54 is a top view taken generally along line 54—54 of FIG. 53 illustrating retraction of the upper horizontal actuator.
Figure 55:
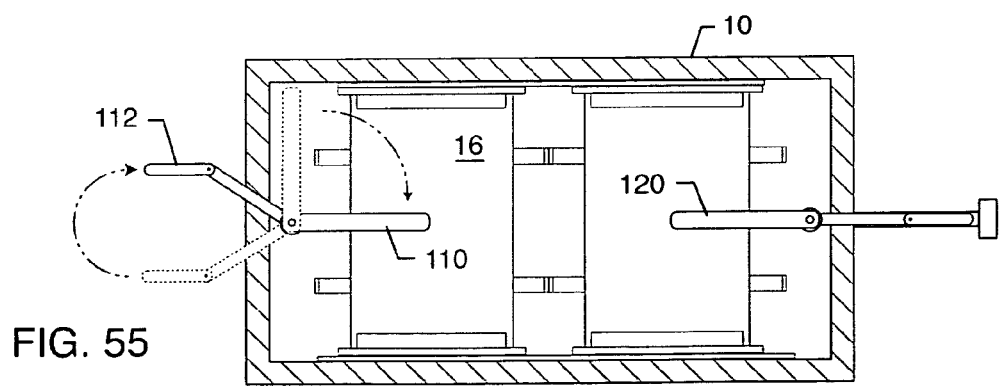
FIG. 55 is a bottom view taken generally along line 55—55 of FIG. 53 illustrating placement of the swing arm under the first column of storage units in accordance with the present invention.
Figure 56:
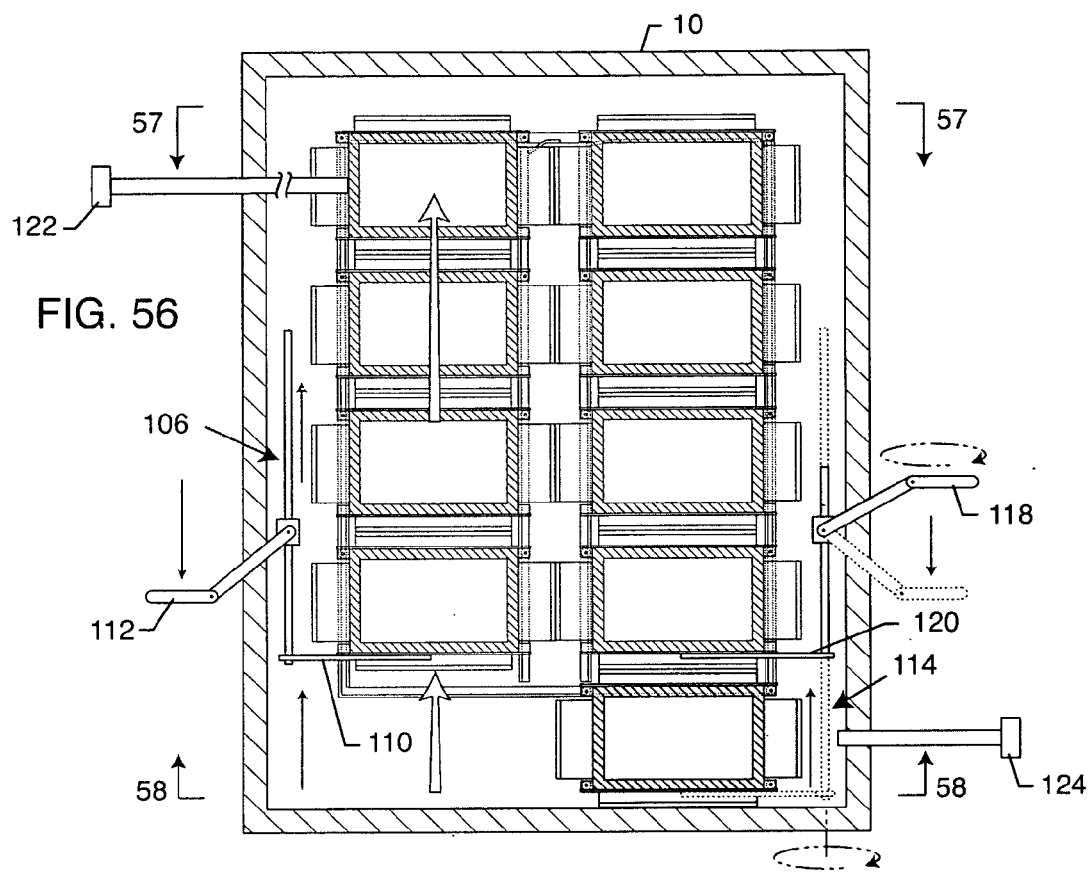
FIG. 56 is a cross-sectional diagrammatic view illustrating the lifting of the first column of storage units using a vertical actuator, in accordance with the present invention.

Once the upper most storage unit 16 (space S1) has been moved from the end column to the vacancy (space S2) in the adjacent column, as illustrated in FIGS. 51 and 52, the rod 122 is retracted out of the housing or track path. The arm 110 is then swung into position under the storage unit 16 at the bottom of the first end column, as illustrated in FIGS. 53 and 55, using the handle 112. The stack of storage units 16 and the end column is then lifted upwardly to create a vacancy in space S7, as shown in FIG. 56. As discussed above, given the weight of the storage units 16, a screw lift or hydraulic lift or jack may be used in this step.

Figure 57:
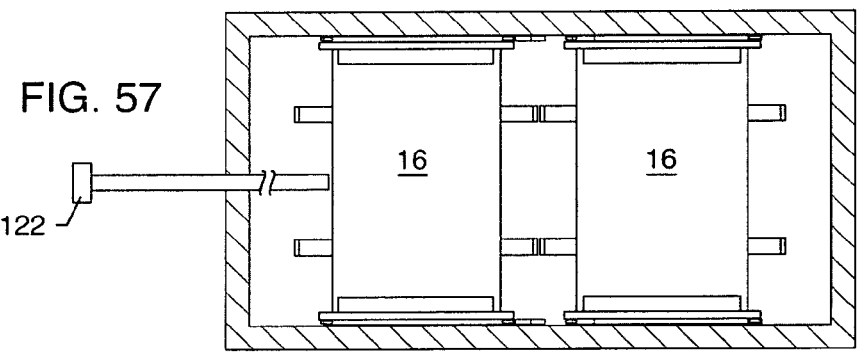
FIG. 57 is a top view taken generally along line 57—57 of FIG. 56.
Figure 58:
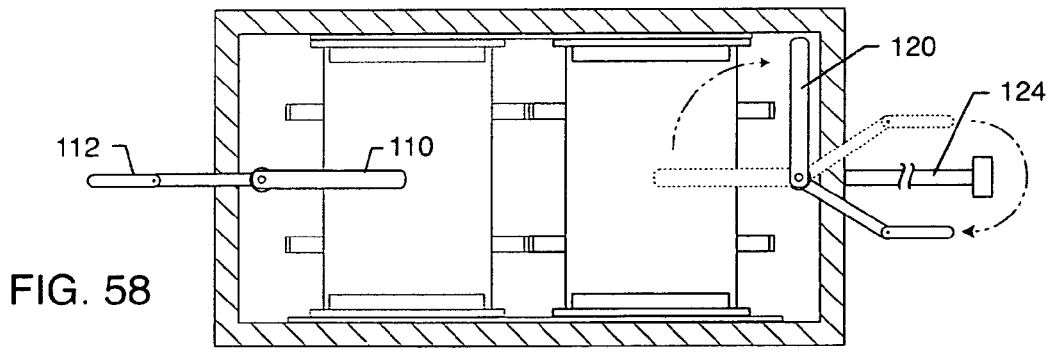
FIG. 58 is a bottom view taken generally along line 58—58 of FIG. 56, illustrating placement of the swing arms, in accordance with the present invention.
Figure 59:
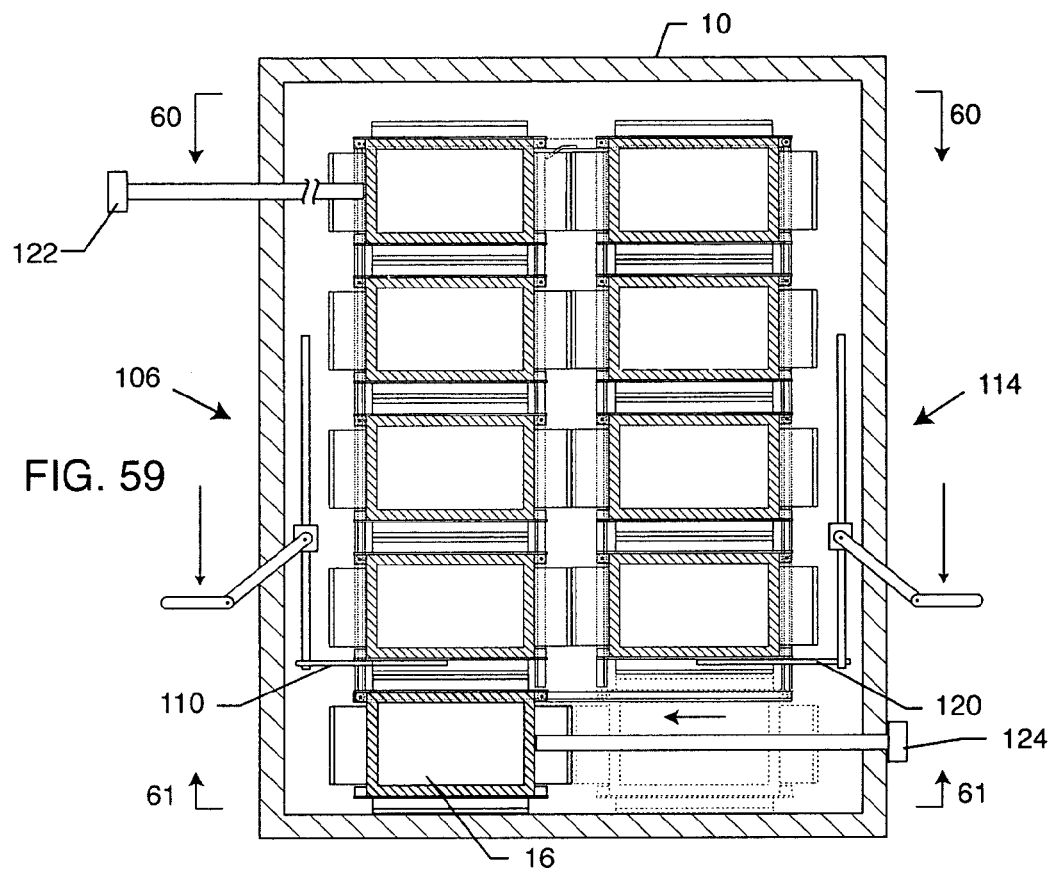
FIG. 59 is a cross-sectional diagrammatic view illustrating movement of a bottom storage unit from one column to another column, in accordance with the present invention.
Figure 60:
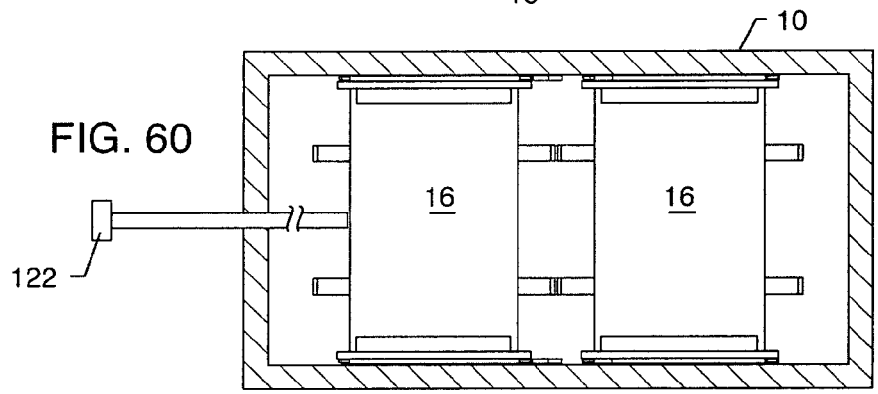
FIG. 60 is a top view taken generally along line 60—60 of FIG. 59.
Figure 61:
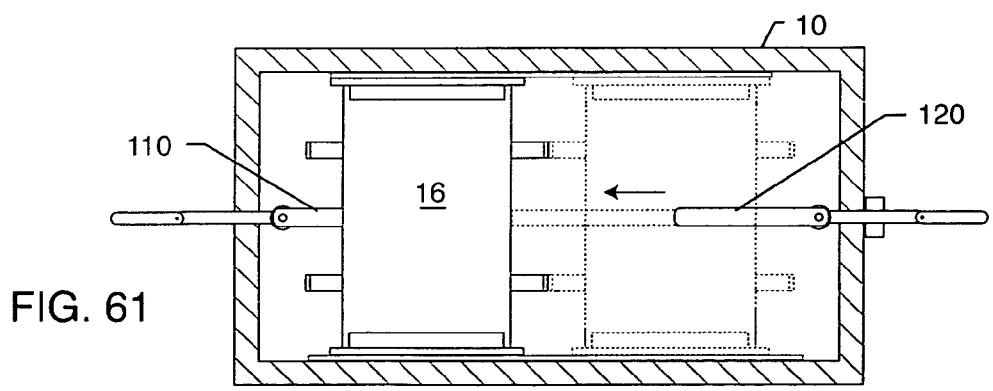
FIG. 61 is a bottom view taken generally along line 61—61 of FIG. 59.

Arm 120 is then moved into position using vertical actuator 114, such that it rests between the two bottommost storage units 16, as illustrated in FIG. 56. Rod 124 is then used to push the lowermost storage unit from space S6 into space S7 in the first end column, as illustrated in FIGS. 56–59. In FIGS. 56–58, FIG. 58 illustrates an intermediate step in the movement of the handle, levers and arms, with FIG. 56 illustrating an initial and end position of these structures.

Figure 62:
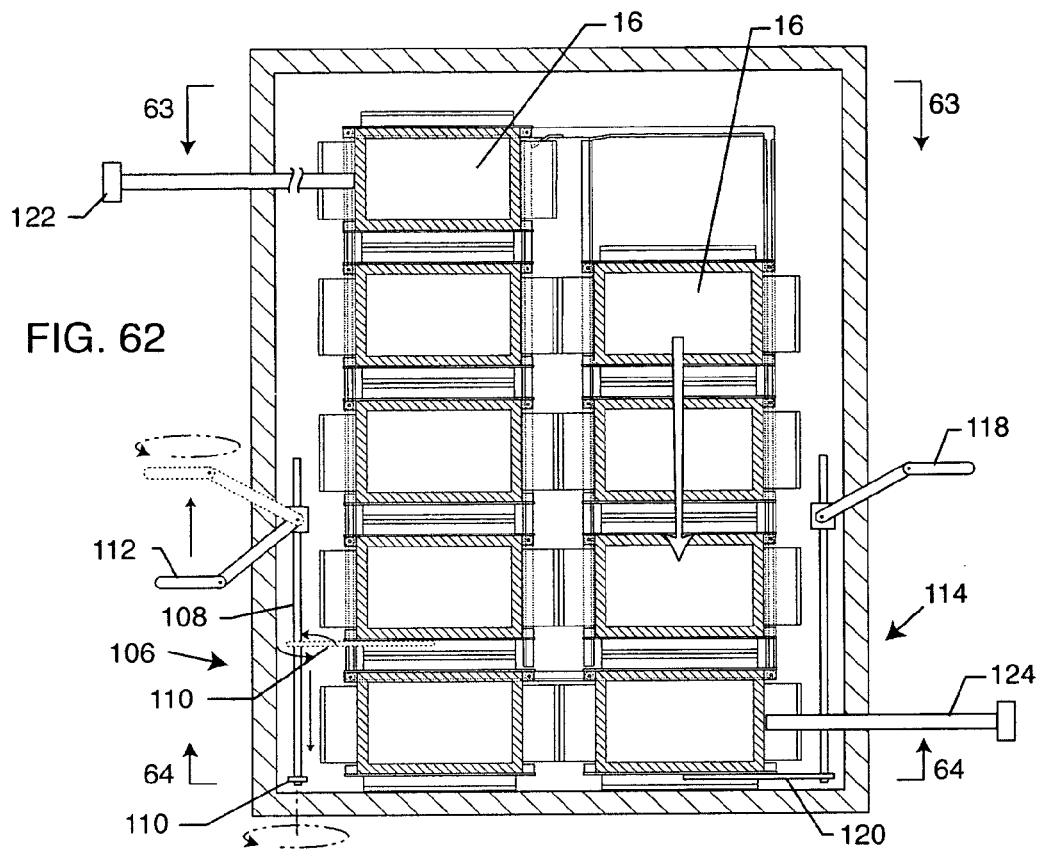
FIG. 62 is a cross-sectional diagrammatic view, illustrating the lowering of the second column of storage units in accordance with the present invention.
Figure 63:
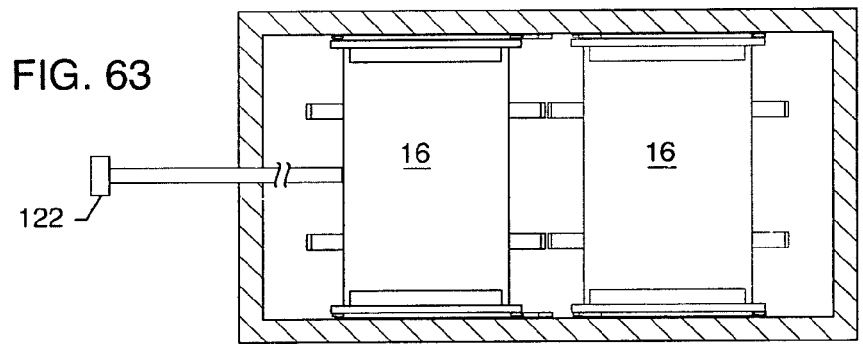
FIG. 63 is a top view taken generally along line 63—63 of FIG. 62.
Figure 64:
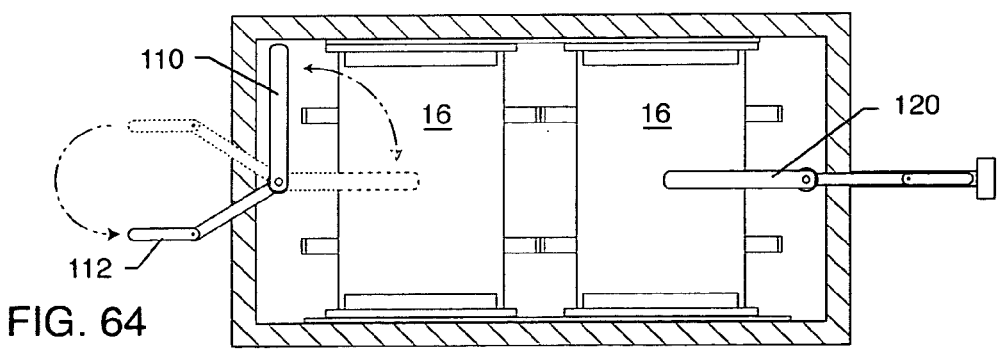
FIG. 64 is a bottom view taken generally along line 64—64 of FIG. 62, illustrating placement of the swing arms in accordance with the present invention.

Rod 124 is then retracted away from the track system and the second end column of now four stacked storage units 16 are lowered to create a vacancy in space S2, as illustrated in FIG. 62. Thereafter, arm 110 is pivoted, such as rotating rod 108 using handle 112, so that it is removed from the bottom of the second of the lowest stacked storage unit into an at rest position, as illustrated in FIGS. 62 and 64. The sequence is then repeated as necessary until the desired storage unit is accessible.

Figure 65:
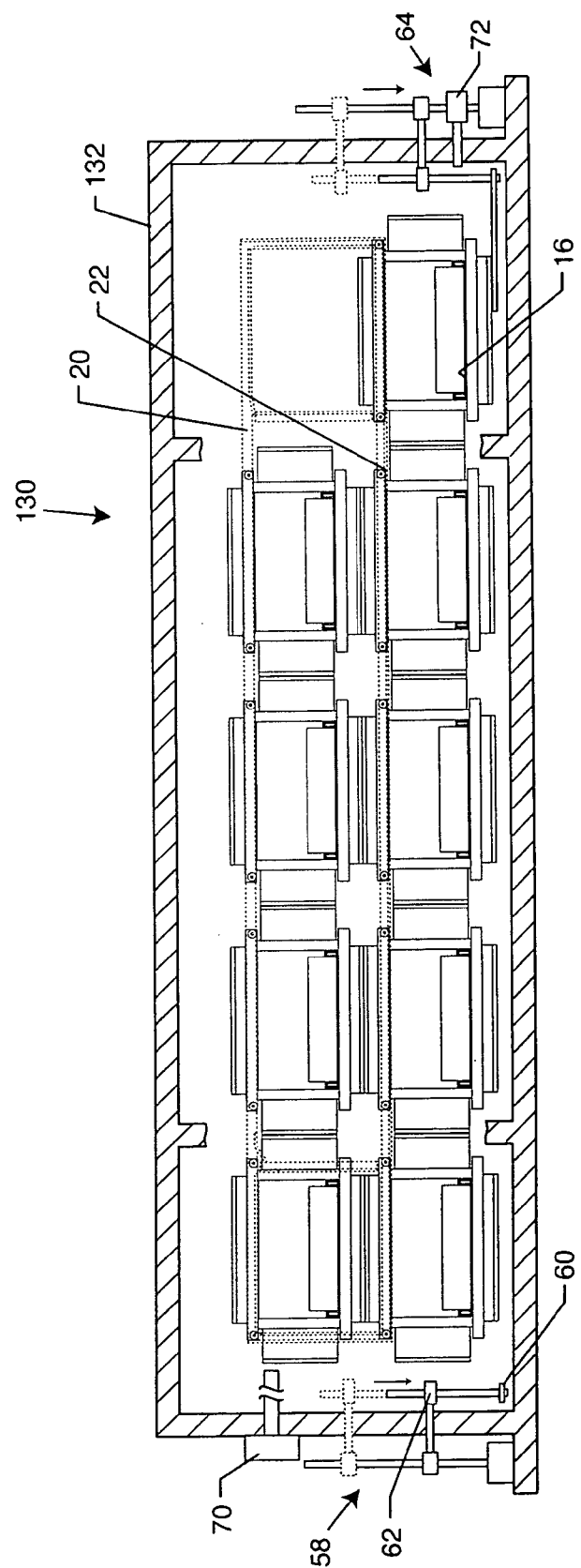
FIG. 65 is a cross-sectional diagrammatic view illustrating the present invention incorporated into a horizontal system, including two rows of storage units.
Figure 66:
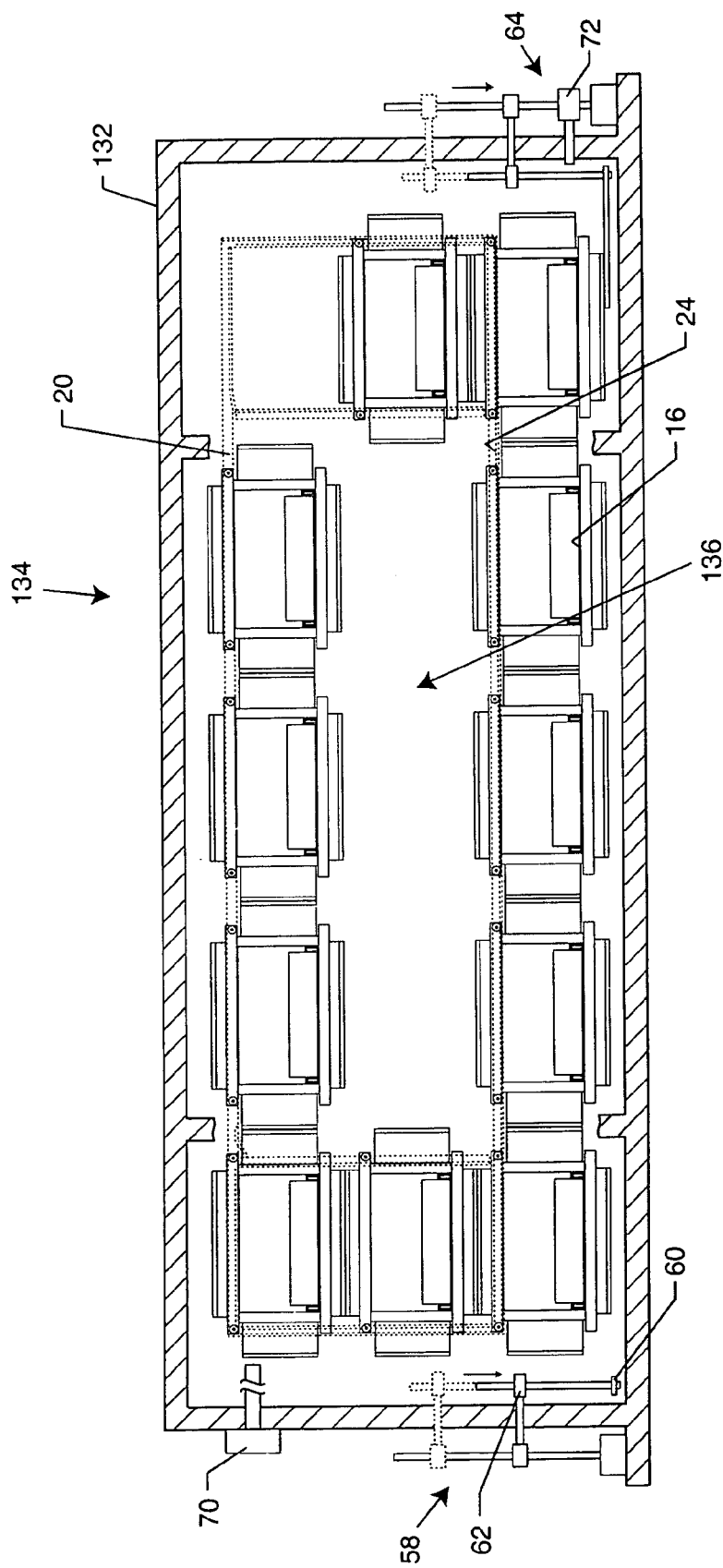
FIG. 66 is a cross-sectional diagrammatic view, similar to FIG. 65, illustrating three storage units in height at opposite end columns of the system, in accordance with the present invention.

With reference now to FIGS. 65 and 66, although the invention has been illustrated in FIGS. 1–64 as primarily a system with two adjacent vertical columns, it will be readily understood that this is not the only configuration of the present invention. For example, with reference to FIG. 65, a horizontal system 130 is shown having two horizontal rows of storage units 16. The storage units 16 may be similar in configuration as described above, and partially supported and slidably moved along tracks 20 and 22. However, in this case, there are only two rows of storage units 16 with a plurality of storage units (in this case five) horizontally aligned. The storage units 16 may be contained within a counter or filing cabinet 132. This configuration is particularly adapted and designed for office drawer systems wherein elongated rows of drawers with a relatively low table or counter space is found. Such applications can also be found in other settings, such as the kitchen where an elongated and relatively low counter is present. Vertical actuators 58 and 64, and horizontal actuators 70 and 72, as discussed above with respect to FIG. 35 are used in a similar manner as described above in order to rotate the storage units 16 to the desired position for access by the end user. The two end columns (in this case only two storage units 16 in height) are lifted, supported, and moved as discussed above. The difference being that instead of a storage unit 16 moving from one vertical column to an adjacent column, the storage unit 16 is moved into a horizontal row of storage units until it is positioned in one of the four corners comprising the vertical columns, as illustrated.

With reference now to FIG. 66, it will be appreciated that the end columns need not be restricted to two drawers in height. Instead, three or more storage units 16 may form the end vertical columns, with the uppermost and lowermost storage unit 16 resting on the horizontal portions of tracks 20 and 24 so as to form the elongated row of storage units 16, as illustrated in FIG. 66. In this embodiment 134, there exists a space or cavity 136 between the end columns and the upper and lower rows of storage units 16. Such space or cavity 136 can be used advantageously, such as for storage purposes, or in the event that the cavity 136 is occupied by wiring, an appliance, etc., which cannot be easily removed, and which must have the system 134 built around it. Using an example of a kitchen, the individual storage units 16 can store and house condiments and other food items. The cavity 136 between the storage units 16 can be a counter work space, or additional slide-out drawers or the like which house and contain items which must be frequently accessed, such as spoons, bowls, etc. It can also be a counter or work space.

It is contemplated by the present invention that the contents of the individual storage units 16 be tracked, such as using bar code symbols or the like, so that the contents of any given storage unit 16 is readily ascertainable. In this manner, using a keypad or electronic interface, the end user can determine in which storage unit a given object is located, or automatically move a given storage unit 16 into the desired location by inputting its assigned number, scanning a bar code from a product, etc.

Although several embodiments have been described in detail for purposes of illustration, various modifications may be made to each without departing from the scope and spirit of the invention. Accordingly, the invention is not to be limited, except as by the appended claims.

What is claimed is:

1. A storage system, comprising:
    a continuous track comprised of generally parallel tracks each having generally parallel upper and lower rails, wherein the track comprises a dual track, including a first set and second set of tracks positioned generally parallel to one another, the first and second sets of tracks each comprise a first rail in a first plane, and a second rail in a second plane and in overlapping arrangement with the first rail;
    a plurality of individual storage units stacked in multiple columns, each storage unit including wheels extending from a top portion thereof and configured to engage the upper or lower rails so as to suspend the storage unit from the rails when disposed at an uppermost or lowermost position in the column and permit selective movement along the track;
    a first vertical actuator having an arm selectively movable under a bottom storage unit of a first end column, and adapted to lift the first end column of storage units;
    a first horizontal actuator for moving a storage unit from a top position in the first end column to a top position in an adjacent column;
    a second vertical actuator having an arm selectively movable under a storage unit, and adapted to support all but a bottom storage unit of a second end column of storage units; and
    a second horizontal actuator for moving the bottom storage unit from a bottom position in the second end column to a bottom position of an adjacent column.

2. The system of claim 1, wherein the first and second end columns are adjacent to each other.

3. The system of claim 1, wherein the first and second end columns are separated by at least one storage unit.

4. The system of claim 1, wherein each storage unit includes a first set of wheels extending therefrom a first distance for engagement with the first rail, and a second set of wheels extending therefrom a second distance for engagement with the second rail.

5. The system of claim 4, wherein the first and second sets of wheels extend from a top portion of the storage unit such that the storage unit is supported by the rails.

6. The system of claim 1, wherein the first and second horizontal actuators include a ram adapted to extend from and contact a side wall of a storage unit and push the storage unit to an adjacent column.

7. The system of claim 1, wherein the first and second horizontal actuators and the first and second vertical actuators are power-driven.

8. The system of claim 1, including control circuitry for coordinating the movement of the actuators.

9. The system of claim 1, wherein the system includes means, apart from the track itself, for determining balance of the storage units.

10. A storage system, comprising:
    a continuous dual track, including a first set and second set of tracks positioned generally parallel to one another, wherein the first and second sets of tracks each comprise a first rail in a first plane, and a second rail in a second plane and in overlapping arrangement with the first rail;
    a plurality of individual storage units stacked in multiple columns, each storage unit including a first set of wheels extending therefrom a first distance for engagement with the first rail, and a second set of wheels extending therefrom a second distance for engagement with the second rail;
    a first vertical actuator adapted to lift a first end column of storage units;
    a first horizontal actuator for moving a storage unit from a top position in the first end column to a top position in an adjacent column;
    a second vertical actuator adapted to support all but a bottom storage unit of a second end column of storage units; and
    a second horizontal actuator for moving the bottom storage unit from a bottom position in the second end column to a bottom position of an adjacent column.

11. The system of claim 10, wherein the first and second sets of wheels extend from a top portion of the storage unit such that the storage unit is suspended by the rails.

12. The system of claim 10, wherein the first and second vertical actuators include an arm selectively movable along a generally horizontal plane under a storage unit for lifting or lowering that storage unit and storage units stacked thereon.

13. The system of claim 10, wherein the first and second end columns are adjacent to each other.

14. The system of claim 10, wherein the first and second end columns are separated by at least one storage unit.

15. The system of claim 10, wherein the first and second horizontal actuators and the first and second vertical actuators are power-driven.

16. The system of claim 15, wherein the first and second horizontal actuators include a ram adapted to extend from and contact a side wall of a storage unit and push the storage unit to an adjacent column.

17. The system of claim 15, including control circuitry for coordinating the movement of the actuators.

18. The system of claim 10, wherein the system includes means, other than the track itself, for determining balance of the storage units.

* * * * *